US009755711B2

United States Patent
Lau et al.

(10) Patent No.: US 9,755,711 B2
(45) Date of Patent: Sep. 5, 2017

(54) LARGE DEVIATION DELAY ANALYSIS OF QUEUE-AWARE MULTI-USER MIMO SYSTEMS WITH MULTI-TIMESCALE MOBILE-DRIVEN FEEDBACK

(71) Applicant: Taiwan Semiconductor Manufacturing Company, Ltd., Hsinchu (TW)

(72) Inventors: Vincent Kin Nang Lau, New Territories (HK); Junting Chen, Kowloon (HK)

( * ) Notice: Subject to any disclaimer, the term of this patent is extended or adjusted under 35 U.S.C. 154(b) by 107 days.

(21) Appl. No.: 14/253,799

(22) Filed: Apr. 15, 2014

(65) Prior Publication Data

US 2015/0071190 A1    Mar. 12, 2015

Related U.S. Application Data

(60) Provisional application No. 61/875,634, filed on Sep. 9, 2013.

(51) Int. Cl.
*H04B 7/04* (2006.01)
*H04B 7/0417* (2017.01)
*H04B 7/0452* (2017.01)
*H04W 72/12* (2009.01)

(52) U.S. Cl.
CPC ......... *H04B 7/0417* (2013.01); *H04B 7/0452* (2013.01); *H04W 72/12* (2013.01); *H04W 72/1226* (2013.01)

(58) Field of Classification Search
CPC .................................................. H04W 72/12
See application file for complete search history.

(56) References Cited

U.S. PATENT DOCUMENTS

| | | | | |
|---|---|---|---|---|
| 2002/0119781 A1* | 8/2002 | Li | ........................ | H04L 27/2601 455/450 |
| 2008/0056184 A1* | 3/2008 | Green | ..................... | H04L 5/023 370/329 |
| 2008/0304516 A1* | 12/2008 | Feng | ..................... | G06F 9/5038 370/468 |
| 2010/0040010 A1* | 2/2010 | You | ....................... | H04L 1/0028 370/329 |

(Continued)

OTHER PUBLICATIONS

Yoo, et al., "On the optimality of multiantenna broadcast scheduling using zero-forcing beamforming," IEEE Journal on Selected Areas in Communications, vol. 24, No. 3, Mar. 2006, pp. 528-541.

(Continued)

*Primary Examiner* — John Blanton

(57) ABSTRACT

A subset of mobile device candidates in a multi-input multi-output (MIMO) channel of network devices is selected for having a feedback priority among a set of mobile device candidates. The selection is based on a set of queue state information of a plurality of mobile device queues for transmitter and receiver devices of the MIMO channel in a multi-user MIMO network. A portion of the subset of mobile device candidates can be selected by a scheduling component of the system. Communications on the MIMO channels can be scheduled to the portion of the subset of mobile device candidates based on the feedback comprising channel state information and on the queue state information of the plurality of mobile device queues.

37 Claims, 15 Drawing Sheets

(56) References Cited

U.S. PATENT DOCUMENTS

| | | | |
|---|---|---|---|
| 2011/0235533 A1* | 9/2011 | Breit | H04B 7/0452 370/252 |
| 2013/0064315 A1* | 3/2013 | Heath, Jr. | C23C 14/04 375/260 |
| 2014/0086178 A1* | 3/2014 | Rangarajan | H04W 72/1221 370/329 |
| 2014/0341048 A1* | 11/2014 | Sajadieh | H04L 5/0085 370/252 |

OTHER PUBLICATIONS

Sharif, et al., "On the capacity of MIMO broadcast channels with partial side information," IEEE Transactions on Information Theory, vol. 51, No. 2, Feb. 2005, pp. 506-522.

Bayesteh, et al., "On the user selection for MIMO broadcast channels," IEEE Transactions on Information Theory, vol. 54, No. 3, Mar. 2008, pp. 1086-1107.

W. Zhang and K. Letaief, "Mimo broadcast scheduling with limited feedback," IEEE Journal on Selected Areas in Communications, vol. 25, No. 7, Sep. 2007, pp. 1457-1467.

Sanayei, et al. "Opportunistic downlink transmission with limited feedback," IEEE Transactions on Information Theory, vol. 53, No. 11, Nov. 2007, pp. 4363-4372.

Diaz, et al., "Asymptotic analysis of reduced-feedback strategies for MIMO gaussian broadcast channels," IEEE Transactions on Information Theory, vol. 54, No. 3, Mar. 2008, pp. 1308-1316.

A. Bayesteh and A. Khandani, "Asymptotic analysis of the amount of csi feedback in mimo broadcast channels," IEEE Transactions on Information Theory, vol. 58, No. 3, Mar. 2012, pp. 1612-1629.

She, et al., "Joint queue control and user scheduling in mimo broadcast channel under zero-forcing multiplexing," International Journal of Communication Systems, vol. 22, No. 12, pp. 1593-1607, Jul. 2009.

M. Kobayashi and G. Caire, "Joint beamforming and scheduling for a multi-antenna downlink with imperfect transmitter channel knowledge," IEEE Journal on Selected Areas in Communications, vol. 25, No. 7, Sep. 2007, pp. 1468-1477.

Bernstein, et al., "The complexity of decentralized control of markov decision processes," Mathematics of operations research, pp. 819-840, Nov. 2002.

Huang, et al.,"Delay-sensitive distributed power and transmission threshold control for s-aloha network with finite state markov fading channels," IEEE Transactions on Wireless Communications, vol. 8, No. 11, pp. 5632-5638, Aug. 2009. 13 pages.

Neely, et al., "Dynamic power allocation and routing for time-varying wireless networks," IIEEE Journal on Selected Areas in Communications, vol. 23, No. 1, Jan. 2005, pp. 89-103.

Dembo, et al., "Large deviations techniques and applications." Springer Verlag, 2009, vol. 38. Retrieved on Jul. 21, 2014, 415 pages.

Hochwald, et al., "Multiple-antenna channel hardening and its implications for rate feedback and scheduling," IEEE Transactions on Information Theory, vol. 50, No. 9, Sep. 2004, pp. 1893-1909.

J. Chung, C. Hwang, K. Kim, and Y. Kim, "A random beamforming technique in mimo systems exploiting multiuser diversity," IEEE Journal on Selected Areas in Communications, vol. 21, No. 5, Jun. 2003, pp. 848-855.

J. D. C. Little, "A proof for the queuing formula: L=W," Operations Research, vol. 9, No. 3, pp. 383-387, May 1961.

Huang, et al., "Stability and delay of zero-forcing SDMA with limited feedback," IEEE Transactions on Information Theory, vol. 58, Issue 10, Oct. 2012, 26 pages.

Neely, "Energy optimal control for time-varying wireless networks," IEEE Transactions on Information Theory, vol. 52, No. 7, Jul. 2006, pp. 2915-2934.

Weiss. "Large deviations for performance analysis: queues, communications, and computing", Chapman & Hall/CRC,1995, retrieved on Oct. 2, 2014, 488 pages.

Corless, et al., "On the Lambert W function," Advances in Computational Mathematics, vol. 5, No. 1, pp. 329-359, Feb. 1996.

Boyd, et al., "Convex Optimization" Cambridge University Press, 2004. Retrieved on Jul. 21, 2014, 730 pages.

\* cited by examiner

LARGE DEVIATION DELAY ANALYSIS OF QUEUE-AWARE MULTI-USER MIMO SYSTEMS WITH MULTI-TIMESCALE MOBILE-DRIVEN FEEDBACK

PRIORITY CLAIM

This application claims priority to U.S. Provisional Patent Application No. 61/875,634, filed on Sep. 9, 2013, entitled "LARGE DEVIATION DELAY ANALYSIS OF QUEUE-AWARE MULTI-USER MIMO SYSTEMS WITH MULTI-TIMESCALE MOBILE-DRIVEN FEEDBACK." The entirety of the aforementioned application is incorporated by reference herein.

TECHNICAL FIELD

This disclosure relates generally to multi-input multi-output (MIMO) systems and, in particular, radio resource management in MIMO systems.

BACKGROUND

Cellular networks such as LTE, WiFi systems or other cellular networks face a variety of unique challenges. For example multiple factors effect throughput of cellular networks such as in a WiFi system, including but not limited to: complex interference in the Industrial, Scientific and Medical (ISM) spectrum, poor spectral efficiency of 802.11 media access control (MAC) protocol, and starvation problems associated with hidden nodes and exposed nodes.

MIMO is an important core technology for next generation wireless systems. In particular, in multi-user MIMO (MU-MIMO) systems, a base station (BS) (with M transmit antennas) communicates with multiple mobile users simultaneously using the spatial degrees of freedom at the expense of knowledge of channel state information at the transmitter (CSIT). Using simple zero-forcing precoder and near orthogonal user selection, a sum rate of M log log K can be achieved with full CSIT knowledge over K users. Yet, full CSIT knowledge is difficult to achieve in practice, and there are a lot of works focusing on reducing the feedback overhead in MIMO systems. For instance, limited-rate feedback and threshold based feedback control schemes have been proposed. A sum rate capacity O (M log log K) can be achieved when only O (M log log log K) users feeding back to the BS.

While a number of works consider reduced feedback design for MU-MIMO, these existing works focus on the throughput performance and assume infinite backlog at the base station. Therefore, the bursty arrival of data from the data source as well as the associated delay performance goes ignored, which can prove important for real-time applications. The above-described deficiencies of conventional WiFi optimization network techniques are merely intended to provide an overview of some contextual background, and are not intended to be exhaustive.

SUMMARY

Herein, various systems, methods, and apparatus are described with control algorithms to exploit the dynamic variation of interference and bursty, or random, traffic signaling by focusing on the throughput performance and the user queuing delay. According to an embodiment, for example, a system comprises a memory storing executable components, and a processor configured to execute the executable components. The system components (e.g., processors and/or software) comprise a feedback filter component and a scheduling component. The feedback filter component is configured to determine a subset of mobile device candidates having a feedback priority from among a set of mobile device candidates based on a set of queue state information of a plurality of transmitters and receivers of a plurality of mobile devices communicatively coupled in a multiple input multiple output channel. The scheduling component is configured to select a portion of the subset of mobile device candidates and to schedule communications with the portion of the subset of mobile device candidates, based on feedback comprising a set of channel state information and the set of queue state information of the plurality of mobile devices.

According to another embodiment, provided is a method that comprises determining a subset of mobile device candidates from among a set of mobile device candidates based on queue state information of a plurality of mobile device queues for a plurality of transmitters and receivers communicatively coupled in a multiple input multiple output channel. A communication is transmitted to the subset of mobile device candidates that initiates feedback comprising channel state information from the subset of mobile device candidates in the plurality of mobile device queues. The method includes selecting a portion of the subset of mobile device candidates for scheduling communications via the multiple input multiple output channel.

In another aspect, a computer readable storage device comprises executable instructions that, in response to execution, cause at least one device including at least one processor to perform operations. The operations comprise determining a subset of mobile device antennas from a set of mobile device antennas, based on queue state information of a multi user queue of a multiple input multiple output channel. A set of feedback is received that comprises channel state information from the subset of mobile device antennas of the multi user queue. A portion of the subset of mobile device antennas is selected based on the channel state information.

In yet another aspect, a device comprises a memory storing executable instructions, and a processor configured to execute the executable instructions to at least receive a broadcast comprising a queue state information dependent feedback candidate data designating a subset of mobile device candidates having a feedback priority from among a set of mobile device candidates based on a set of queue state information of a plurality of mobile device queues for a multiple input multiple output channel. The processor facilitates the execution of the executable instructions to communicate feedback comprising local channel state information in response to a feedback filtering condition being satisfied.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the various innovations when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
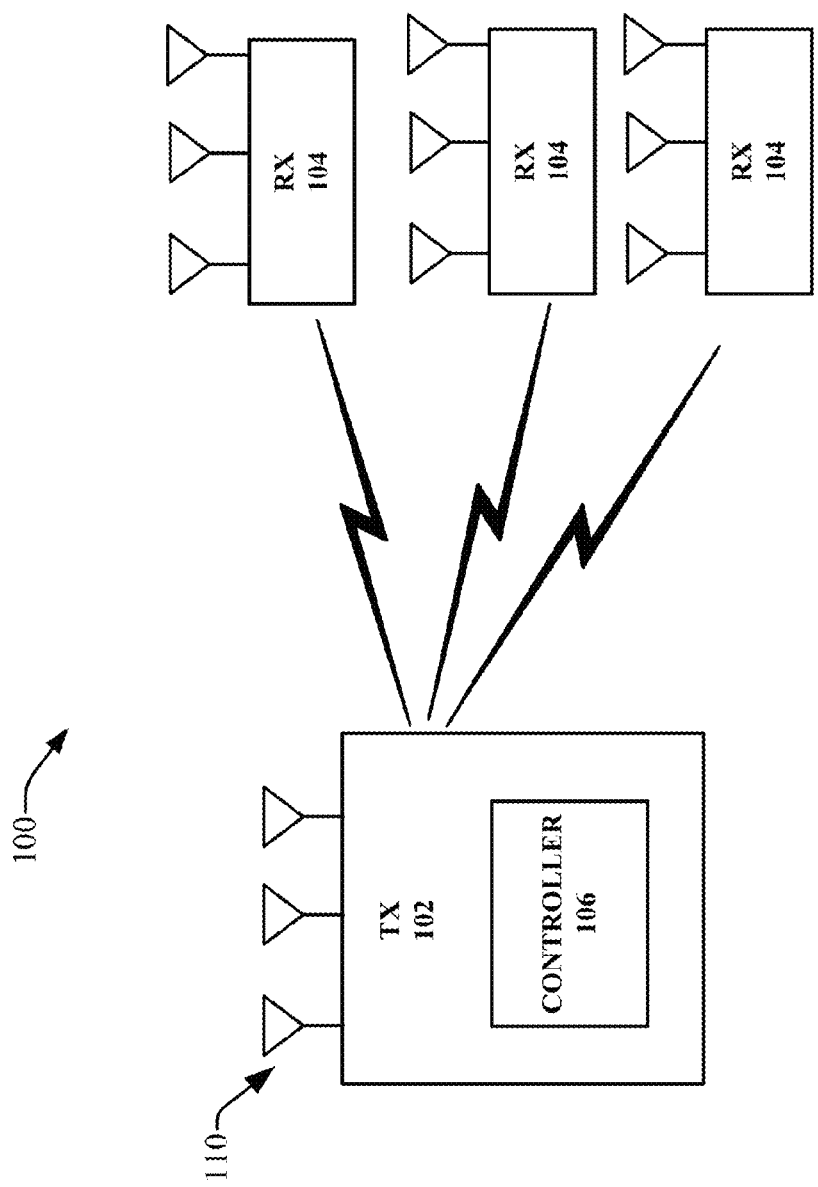
FIG. 1 illustrates a schematic example of an MU-MIMO network environment in accordance with an embodiment.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used by a scenario identification component to infer a starvation scenario present in a WiFi network in real-time. Furthermore, the artificial intelligence system can be used by a heuristic component to automatically determine heuristic probabilities associated with possible modifications to operating parameters that could alleviate an identified starvation scenario.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

Overview

In consideration of the above described deficiencies, multi-user multi-input-multi-output (MU-MIMO) systems are described herein that can transmit data to multiple users simultaneously using the spatial degrees of freedom with user feedback channel state information (CSI). A low feedback queue-aware user scheduling algorithm is disclosed for the MU-MIMO systems, in which the delay (e.g., user queuing delay or duration) is taken into consideration, especially for real-time applications. In addition to the delay, the operations also include reducing feedback user scheduling focus for throughput of the MIMO channel.

In one aspect, methods of operations comprise a two-stage queue-aware user scheduling algorithm, which consists of a queue-aware mobile-driven feedback filtering stage and a user scheduling stage, where the feedback filtering policy is obtained from an optimization technique that achieves a maximum queue stability region of the MU-MIMO system. The queuing performance of the proposed scheduling algorithm is further evaluated by using the sample path large deviation analysis. A large deviation decay rate for the proposed algorithm is much larger than that of the CSI-only user scheduling algorithm. The numerical results also demonstrate that the proposed algorithm performs much better than the CSI-only algorithm requiring only a small amount of feedback.

Non-Limiting Embodiments for Large Deviation Delay Analysis of Queue-Aware Multi-User MIMO Systems with Multi-Timescale Mobile-Driven Feedback FIG. 1 illustrates a distributed wireless network 100 of an MU-MIMO system in accordance with some embodiments. Aspects of the systems, apparatuses or processes explained herein can constitute executable components embodied within machine(s), e.g., embodied in one or more computer readable mediums (or media) or storage devices associated with one or more machines. Such component, when executed by the one or more machines, e.g., computer(s), computing device(s), virtual machine(s), etc., can cause the machine(s) to perform the operations described.

In an aspect, wireless network 100 is a multiple input multiple output (MIMO) network. The distributed wireless network illustrated in FIG. 1 includes a transmitter (Tx) 102, a plurality of receivers (Rx) 104 and a central controller 106. The transmitter 102 and receivers 104 can communicate directly with each other in accordance with MIMO communications techniques. The transmitter 102 and the receivers 104 can represent any type of wireless communication device, which can have both transmit and receive capabilities. The controller 106 can be a stand-alone wireless communication device configured to communicate wirelessly with the transmitter 102 and receivers 104, or can be located within any one of the transmitter 102 or receivers 104, such as with the transmitter 102. For example, the transmitter 102, the receivers 104 or the controller 106 can be part of a base station, an access point, and/or a user device. The term node as used herein is used to refer to any apparatus that functions as a transmitter or receiver.

Although FIG. 1 depicts one transmitter (Tx) and three receivers (Rx), it should be appreciated that any number of transmitters and receivers, which could also form Tx-Rx pairs can also operate in network 100 in accordance with the subject disclosure. As described herein, the network 100 constitutes a MIMO system with a transmitter (Tx) and K receivers (Rx). Each transmitter and each receiver has $M_i$ and $N_i$ antennas 110, respectively Due to the broadcast nature of wireless communication in cellular networks, delay aware MU-MIMO systems and various algorithms for scheduling communications taking into consideration the bursty or random arrival of the data source and the associated delay performance are embodied herein. Specifically, the CSI information can provide a good opportunity to transmit data whereas the Queue State Information (QSI) can provide an indication of the urgency of the data processing or data flow. A delay-aware MU-MIMO system can incorporate both the CSI and QSI in the user device scheduling for communication over the network 100. Thus, a complexity of factors can be involved to integrate these sets of information in determining the user priority via scheduling processes. In general, there are still a number of first order technical challenges associated with designing delay-aware MU-MIMO.

First, in a real-time application, it is important to exploit CSI and QSI in the user scheduling of communications among base station, transmit and receive antennas. For example, a priority metric can be generated that strikes a balance between transmission opportunity (based upon the CSI) and urgency (based upon the queue delay or duration length). On one hand, the Markov decision process (MDP) based methods result in high complexity (exponential with respect to K users/receiver devices/candidates). On the other hand, a brute-force application of Lyapunov optimization techniques in MU-MIMO is also not always feasible because of the associated exponential complexity of user selection for MU-MIMO. Second, due to the QSI-aware control algorithm, the service rate of the data queues are state-dependent and the queue dynamics from the K data flows are coupled together, which can make the queuing delay analysis difficult.

Figure 2:
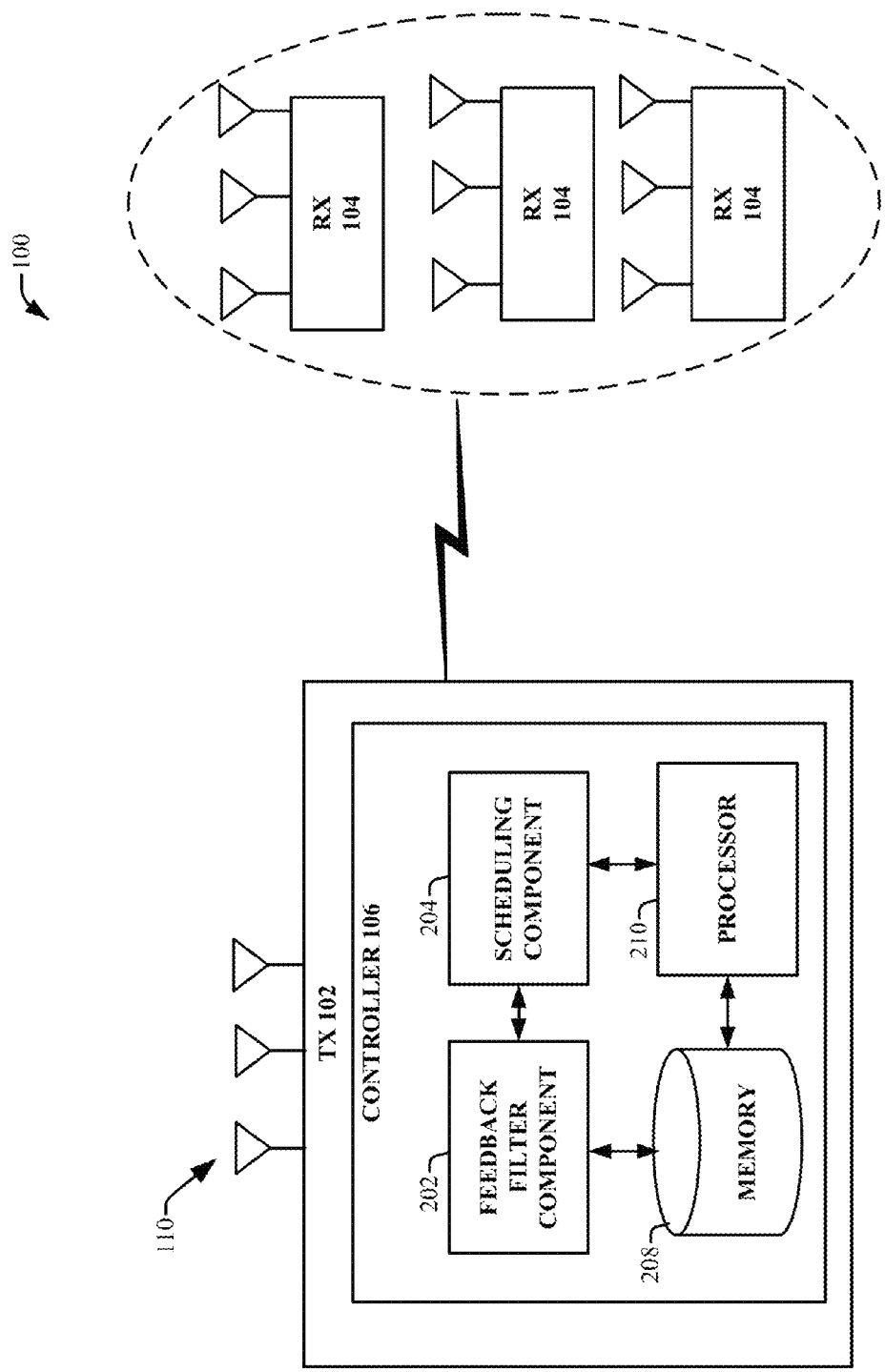
FIG. 2 illustrates a block diagram of an MU-MIMO network in accordance with another embodiment.

Referring now to FIG. 2, illustrated is the network 100, which can operate as a MU-MIMO downlink system with an M-antenna basestation (BS) (e.g., transmitter 102 with controller 106) and K multi-antenna mobile users (e.g., Tx, Rx). The BS 102 can apply random beamforming for the MU-MIMO network system 100 to exploit the multi-user diversity. To overcome the complexity challenge of user scheduling, the controller 106 is configured to operate a two-timescale delay-aware user scheduling policy via the feedback filter component 202 and the scheduling component 204. The controller 106 further comprises a memory 208 that includes state dependent queues coupled together for the MU-MIMO system.

The proposed policy comprises two stages operated by the feedback filter component 202 and the scheduling component 204, namely the queue-aware user-driven feedback filtering stage and the dynamic queue-weighted user scheduling stage respectively. At the first stage (operating at a slower timescale), the feedback filter component 202 can operate to determine a subset of mobile device candidates (e.g., receiver devices 104) with a feedback priority from among all mobile devices communicating on the network 100. The BS or Tx 102 can operate to broadcast a QSI-dependent user feedback candidate list, in which only the mobile user devices in the list as mobile device candidates are enabled to feedback their local CSI to the BS 102.

At the second stage (operating at on a faster timescale), the scheduling component 204 is configured to select a portion of the subset of mobile device candidates and to schedule communications with the portion of the subset of mobile device candidates. The scheduling component 204 can operate to select the portion of candidates from the subset of mobile device candidates and to schedule the communications based on feedback from the subset of mobile device candidates, which comprises CSI and the QSI of the plurality of mobile device queues. For example, the BS 106 can operate to select the best user according to the queue-weighted metric among the users selected in the first stage by the feedback filter component 202. Based on the two-timescale user scheduling policy, the controller 106 can operate to analyze and facilitate communications with the delay performance of the MU-MIMO system.

In an aspect, the wireless network 100 operates as a downlink MU-MIMO system with an M-antenna BS 102 and K geometrically dispersed mobile users 104 (K>>M). Each mobile user device 104 can comprise N receive antennas, for example. Using MU-MIMO techniques, the BS 102 transmits M data streams to a group of selected users (subset of mobile device candidates), which operates at each time slot as a first timescale. The wireless channel between each user device and the BS 102 can be modeled, for example, as a Rayleigh fading channel. Specifically, the received signal $y_k \in C^{N \times 1}$ by a user device k is given by $$y_k = \sqrt{P} H_k x + n_k \quad \forall k \in A(t) \qquad (1)$$

where $x \in C^{M \times 1}$ is the normalized transmitted signal with E[Tr(xx*)]=M, i.e., the normalized transmit power on each antenna is assumed to be one, $H_k \in C^{N \times M}$ is the zero mean, unit-variance circularly symmetric complex Gaussian channel matrix from the transmitter or BS to the user device k, $n_k \in C^{N \times 1}$: CN (0, $I_N$) is the Gaussian additive noise vector, P is the transmit power at the BS, and A (t) denotes the set of the scheduled users at time slot t. The below following assumptions are made on the channel matrices $\{H_k\}$ of CSI.

The channel matrix $H_k(t)$ is a N×M complex matrix for user k, for example, where each element $h_k^{(i,j)}(t)$ has a zero mean unit variance stationary Gaussian distribution CN (0,1), and autocorrelation function $R_k^{(i,j)}(\tau)$. It is assumed that $R_k^{(i,j)}(\tau) \to 0$, exponentially fast as $\tau \to \infty$. The mobile users are assumed to have perfect knowledge of their local CSI. However, only a selected subset of users will feedback their CSI to the BS 102, and the feedback information is delivered through a noiseless feedback channel.

At the BS 102, random beamforming is used to support near-orthogonal data stream transmissions to the selected user devices without knowing the full CSI or global CSI of the network. The BS 102, for example, chooses M random orthonormal vectors $\{\phi_1, \ldots, \phi_M\}$, where $\phi_m \in C^{M \times 1}$ are generated according to an isotropic distribution. Let $s(t)=(s_1(t), \ldots, s_M(t))$ be the vector of the transmit symbols. The transmit signal is thus given by $$x(t) = \sum_{m=1}^{M} \phi_m s_m(t).$$

Therefore, the receive signal at the k-th user is $$y_k(t) = \sum_{m=1}^{M} \sqrt{P} H_k \phi_m s_m(t) + n_k.$$

It is assumed that the receivers of user devices (the candidates) know the beamforming vectors $\{\phi_m\}$. The effective SINR of the i-th beam on the n-th receive antenna of the k-th user device, for example, can be calculated as follows, $$SINR_{k,n}^i = \frac{|H_k^{(n)} \phi_i|^2}{\sum_{j, j \neq i} |H_k^{(n)} \phi_j|^2 + 1/P}. \qquad (2)$$

where $H_k^{(n)}$ denotes the n-th row of the channel matrix $H_k$ of user k. By selecting the users with the highest SINR on each beam, the transmitter can support near-orthogonal transmissions and exploit multi-user diversity without the global CSI $\{H_k\}$.

In another aspect, data arrives at the BS 102 in random, bursty packets for different user devices (e.g., Rx 104). Let $A_k(t)$ denote the number of packets that arrive at the BS 102 for user k during time slot t, and $A(t)=(A_1(t), \ldots, A_K(t))$. The arrivals $A_k(t)$ of the system are identically and independently distributed over different time slot t. The following assumptions regarding the bursty arrival processes $A_k(t)$ of data are made.

The packet arrival $A_k(t)$ for the bursty data are identically and independently distributed (i.i.d.) with respect to (w.r.t.) t and independent w.r.t. k according to a general distribution with mean $E[A_k(t)]=\lambda_k$ and finite moment generating function (MGF)

$$\psi_{A,k}(\theta) = E[e^{\theta A_k}].$$

The packet length is assumed to be constant L bits.

The BS 102 maintains queuing backlogs $Q_k(t)$ for each user k. Let $D_k(Q(t), H(t))$ represent the amount of departure in packets for user k at time slot t, where $Q(t)=(Q_1(t), \ldots, Q_K(t))$ and $H(t)=(H_1(t), \ldots, H_K(t))$. $D_k(-)$ depends on the specific user scheduling policy. The queuing dynamics for user k 104 can be given by $$Q_k(t+1) = [Q_k(t) - D_k(Q(t), H(t))]^+ + A_k(t) \qquad (3)$$

where the operator $[-]+$ represents $[w]^+ = \max\{0, w\}$. Here packet drops or retransmissions are not considered. Using Little's Law, the average delay of the k-th user is given by $\overline{T}_k = \overline{Q}_k / \overline{D}_k$, where $\overline{Q}_k$ is the average backlog for the k-th queue and $\overline{D}_k$ is the average departure at each time slot. As a result, there is no loss of generality to study the queue length $Q_k$ for the purpose of understanding the queue length or queue delay. Obviously, the queue length (the delay) of the MU-MIMO system 100 depends on how the channel resources are utilized. Hence, the user scheduling component 204 operates to adjust the channel access opportunity for all the users 104 so that their queue lengths (or delay) are minimized while maintaining a high system throughput.

Figure 3:
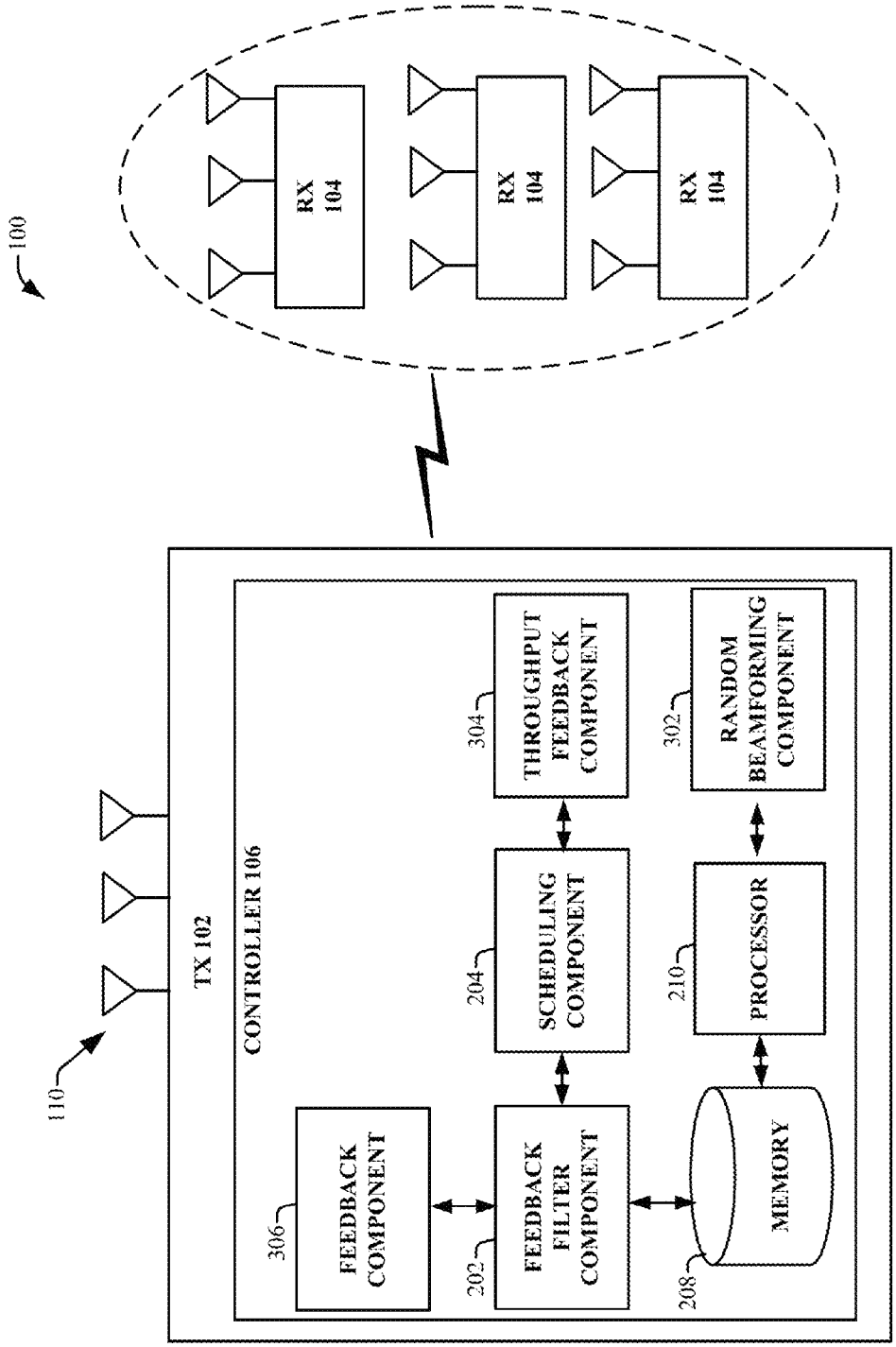
FIG. 3 illustrates another block diagram of an MU-MIMO network in accordance with another embodiment.

Referring now to FIG. 3, illustrated is the MU-MIMO system 100 that operates delay-aware user scheduling based on both the CSI (to capture transmission opportunity) and the QSI (to capture urgency). In particular, the controller 106 of the system 100 is configured to operate a control policy that can maximize the queue stability region. However, conventional throughput optimal (in stability sense) user scheduling policies such as max-weighted-queue (MWQ) algorithms require global CSI and global QSI knowledge. To overcome these challenges, the system 100 implements a two-timescale user scheduling solution.

The controller 106 can operate independently as a base station, an access point, or as a component of the Tx 102 or Rx 104, and comprises the components discussed above as operable instructions of the processor 210 or to different corresponding processors. The controller 106 further comprises a random beamforming component 302, a throughput feedback component 304, and a feedback component 306.

The BS controller 106 determines and broadcasts the user feedback probability $\{p_1(Q), \ldots p_K(Q)\}$ based on the user queuing backlogs $Q(t)$ for every set of T time slots. The random beamforming component 302, for example, is configured to transmit, at a set of time slots, a communication (e.g., the user feedback probability) that identifies the subset of mobile device candidates prior to receiving the set of channel state information, based on random beamforming (e.g., spatial filtering) that facilitates a near-orthogonal data stream transmission to the subset of mobile device candidates and without knowing the CSI of the mobile devices 104 of the network. The scheduling component 204, for example, can operate to select the mobile device candidates 104 identified in the communication broadcasted such that user device candidates 104 having a long queue, long queue duration, or longer queuing delay according to a predetermined threshold or relative to the global set of user devices within the network 100 are designated with a priority for feeding back. The feedback component 306 is configured to determine a user feedback amount that enables a determination of the subset of mobile device candidates. The controller 106 operates to analyze the QSI, determine the feedback probabilities from the analysis and determined feedback amount, and further broadcast the user probabilities computed from the user queuing backlogs at a timescale based on a number of time slots. The number can be an integer that is greater than one, for example.

Mobile user device k of the network 100 (e.g., Tx 102) can randomly feedback to the BS controller 106 in the stage II operated at least partially by the scheduling component 204 with probability $p_k$. The Stochastic feedback filtering policy comprising, for example, a stochastic feedback filtering condition being utilized can be denoted as $\chi_k \in \{0, 1\}$ with $P(\chi_k=1)=p_k$, and a user device k feeds back when $\chi_k(t)=1$. The operation of the mobile feedback filter component 202 is to save the feedback cost by reducing the number of lower priority user devices k that feedback data and/or local CSI to the BS. If the condition is satisfied, the broadcast of the random beamforming component 302 enables the user devices with the satisfied condition to effectively feedback their local CSI. The throughput feedback component 304 is configured to generate a feedback probability vector that stabilizes the arrival data vectors from the feedback within the queue stability region to achieve an increased throughput.

If the feedback indicator $\chi_k=1$, then the user device k (having satisfied the stochastic feedback filtering condition and being among the subset of mobile devices of the network) measures the effective SINR vector $\{SINR_{k,n}^1, \ldots, SINR_{k,n}^M\}$ on each receive antenna n according to the equation (2) above and finds the strongest beam $i^*(k,n) = \arg\max_{1 \leq i \leq M} SINR_{k,n}^i$. The user device (Tx, Rx) then feeds back the selected beam index $i^*(k,n)$ and the associated $SINR_{k,n}^{i^*(k,n)}$ to the BS on each n antenna. The set of feedback user devices (e.g., subset of mobile device candidates) at time slot t is denoted by F (t). The BS controller 106 via the throughput feedback component 304, for example, schedules user $k^*(i)$ to transmit at the i-th beam to maximize the queue-weighted throughput, i.e., $k^*(i) = \arg\max_{k \in F(t)} Q_k \log(1+\gamma_k^i)$, where $\gamma_k^i = \max_{n \in N(k,i)} SINR_{k,n}^i$ denotes the highest SINR of user k on the i-th beam over n $\in$ N (k,i). Here $N(k,i) = \{n: 1 \leq n \leq N, i^*(k,n)=i\}$ denotes the set of receive antennas of user k 104 that have fed back the SINR for the i-th beam. As a result, the stage II user scheduling exploits the multi-user diversity among the set of users 104 attempting to feedback F (t).

The following lemma illustrates that, in a MU-MIMO system 100, it is sufficient for each user feeding back only the beam with the highest SINR as Stage II policy suggests.

Lemma 1 (SINR Property of a MU-MIMO Channel Capacity)

If $\max_{k \in F, 1 \leq n \leq N} SINR_{k,n}^i \geq 1$, $\forall i=1 \ldots M$, then a user will not have maximum SINRs for more than two beams on one antenna, i.e., for $(k^*,n^*) = \arg\max_{k \in F, 1 \leq n \leq N} SINR_{k,n}^i$, thus $SINR_{k^*,n^*}^i = \max_{1 \leq j \leq M} SINR_{k^*,n^*}^j$, $\forall i$. The probability for violating the condition in Lemma 1 exponentially decreases with respect to the number of feedback users, and hence can be negligible.

Figure 4:
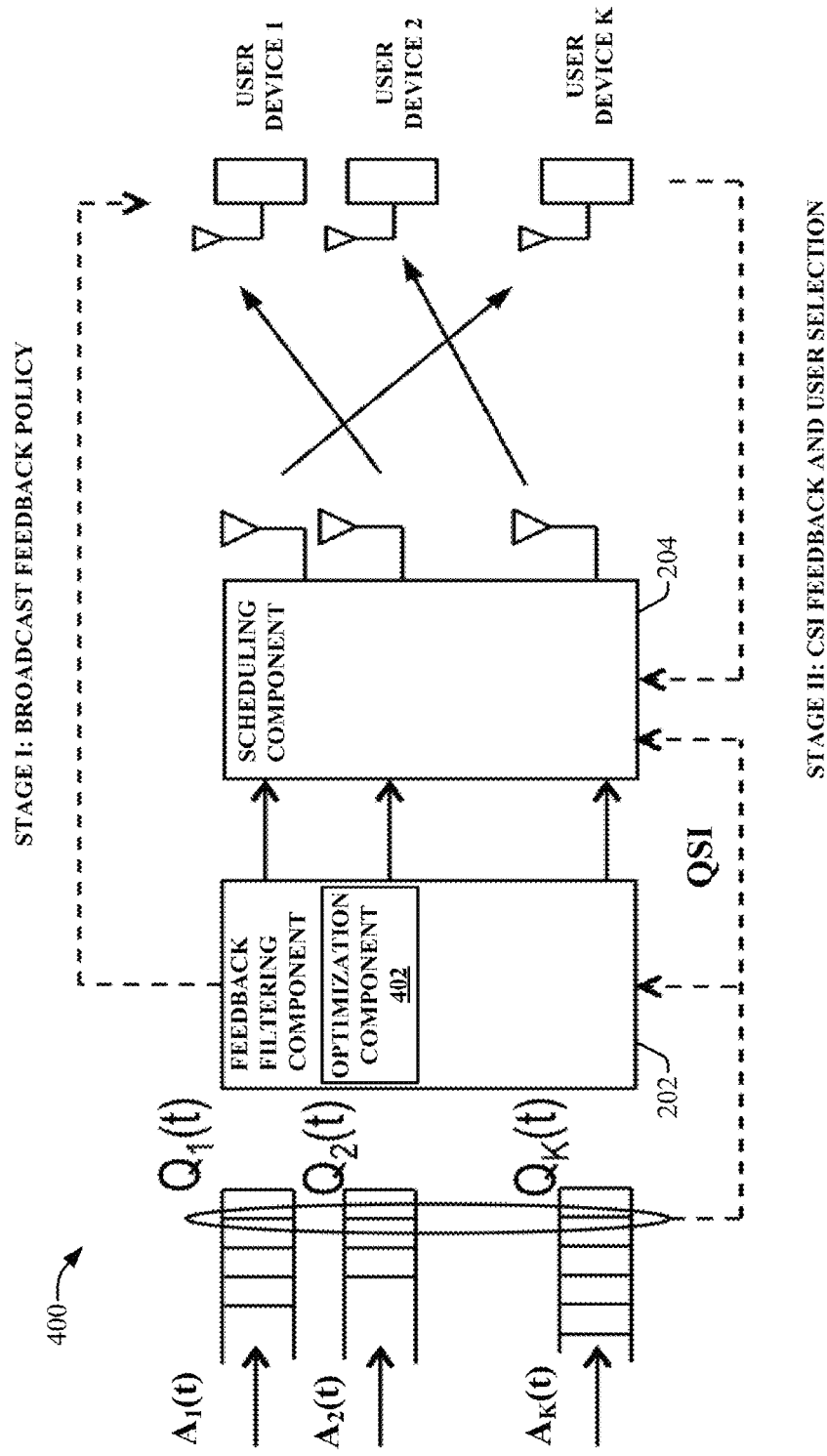
FIG. 4 illustrates a schematic example of an MU-MIMO network environment in accordance with an embodiment.

Referring now to FIG. 4, illustrated is an embodiment of a system 400 that operates a two stage user scheduling policy for communication systems and devices within MU-MIMO networks. The system 400 operates to balance the transmission opportunity and urgency with a low complexity and low feedback cost strategy. For user devices (e.g., 1, 2 . . . K) with a long queue, for example, a feedback priority is communicated to enable feedback of CSI for the designated user devices and prevent feedback of other user devices within the network during the stage I feedback filtering phase via the feedback filtering feedback component 202. The feedback filter component 202 is further configured to determine the subset of mobile device candidates by selecting mobile device candidates from the set of mobile device candidates based on the QSI of the queues $A_1(t) \ldots A_K(t)$ that are determined to satisfy a defined condition associated with a queue delay length, such as a threshold delay, or a percentage of user devices of a ranking of the delays for all user devices communicatively coupled to the MU-MIMO system.

User devices (1, 2 . . . K) that have passed the stage I by satisfying filtering conditions broadcasts by the feedback filtering component 202 can then compete for channel access based on the stage II scheduling component 204 configured for queue weighted scheduling, in which users with better queue weighted metric will be served or scheduled for communications with priority. The scheduling component 204 is configured to analyze the subset of selected mobile devices that feedback CSI and further schedule the user devices for transmission on the MU-MIMO channel based on the CSI feedback received.

Moreover, the two stages processing can be implemented on different timescales. The SINR feedback from the user devices and user scheduling in stage II via the scheduling component 204 are performed at every time slot t, while the user feedback probability $\{p_k(Q)\}$ in the filtering stage via the feedback filtering component 202 determined in stage I can be updated once every T time slots. For example, T can be an integer greater than one. The update period T balances the performance of the two-timescale policy with the control signaling overhead. With a larger T, there is a smaller signaling overhead associated with broadcasting $\{p_k(Q)\}$ in stage I but then the feedback priority may be driven by outdated QSI.

In an aspect, the feedback filter component 202 can be configured to determine user feedback probabilities at a number of time slots based on a set of user queuing backlogs. Each feedback probability can be determined for or correspond to a user mobile device within the network and, thus, vary among the user mobile devices within the network. The feedback probability for each device operates to determine the probability for the corresponding device to feed back its local CSI at each time slot. The feedback filter component 202 can communicate the user feedback probabilities to mobile device candidates (potential mobile devices), for example, and enable the mobile device candidates to feedback CSI according to the user feedback probabilities that independently correspond to each mobile device. For example, for a user or mobile device (candidate) A that has a feedback probability p=0.2, device A has a 0.2 probability to feedback at each time slot. The feedback probability p can change for every time slot, or it may change after a certain number of time slots where the number can be an integer greater than 1 (e.g., every number T=100 time slots).

The feedback filtering component 202 control in stage I plays a critical role in the overall delay performance of the MU-MIMO system 400 and comprises an optimization component 402 that is configured for performing a Lyapunov optimization technique to derive the stage I feedback filtering policy operations and to achieve the maximum queue stability region in the MU-MIMO system.

The optimization component 402 can operate to determine the queue stability and the stability region as provided below.

Definition 1 (Queue Stability):
The queuing system is called stable if $$\limsup_{t\to\infty} \frac{1}{t} E[\max_k Q_k(t)] < \infty.$$

Definition 2 (Stability Region and Throughput Optimal):
The stability region C is the closure of the set of all the arrival rate vectors $\{\lambda_k\}$ that can be stabilized in a MU-MIMO system for some feedback probability vector $\{p_k\}$ in the two-timescale scheduling framework. A throughput optimal feedback control is a feedback probability vector $\{p_k\}$ that stabilizes all the arrival rate vectors $\{\lambda_k\}$ within the stability region C.

The Data Rate and the Amount of Feedback:
Let $J_k^i(Q,H,c) \in \{0,1\}$ be the scheduling indicator of the k-th user on the i-th beam according to the Stage II policy of the scheduling component 204. Therefore, the instantaneous data rate for user k is given by $$R_k(Q, H, c) = \sum_{i=1}^{M} J_k^i(Q, H, c)\chi_k \log(1 + \gamma_k^i). \quad (4)$$

The conditional feedback cost S (Q) and the average feedback cost $\overline{S}$ is defined as follows, $$S(Q) = E\left[\sum_k \chi_k \mid Q\right] = \sum_k p_k(Q), \text{ and } \overline{S} = E[S(Q)]. \quad (5)$$

In addition, the minimum average feedback cost to achieve the maximum queue stability region C in the MU-MIMO system is denoted as $\overline{S}^*$.

As provided above, the optimization component 402 performs an optimization using the feedback filtering control policy that is derived from the Lyapunov technique and to achieve the throughput optimality.

The Lyapunov function is defined as $L(Q) = \Sigma_k Q_k^2$. Then the one-step conditional Lyapunov drift $\Delta L(Q(t))$ is given by, $$\Delta L(Q(t)) \triangleq E[L(Q(t+1)) - L(Q(t)) \mid Q(t)]. \quad (6)$$

The following lemma establishes the relationship between the Lyapunov drift (6) and the queue stability.

Lemma 2 (Lyapunov Drift and the Queue Stability)
Given positive constants V and $\epsilon$, the K queues of the MU-MIMO system $\{Q_1(t), \ldots, Q_K(t)\}$ are stable if the following condition is satisfied, $$\Delta L(Q(t)) + VE\{S(Q(t)) \mid Q(t)\} \le C_0 K - \varepsilon \sum_k Q_k(t) + V\overline{S}^* \quad (7)$$

for some constant $C_0 < \infty$ and all Q(t). The average queue length satisfies $$\sum_k \overline{Q}_k \triangleq \limsup_{T\to\infty} \frac{1}{T} \sum_{\tau=0}^{T-1} \sum_k E[Q_k(\tau)] \le \frac{C_0 K + V\overline{S}^*}{\varepsilon} \quad (8)$$

and the average feedback cost satisfies $$\overline{S} \triangleq \limsup_{T\to\infty} \frac{1}{T} \sum_{\tau=0}^{T-1} S(Q(\tau)) \le \overline{S}^* + C_0 K / V. \quad (9)$$

Proof. The proof can be extended from [Lemma 1] by replacing the power cost function with the feedback cost function S (Q) defined in (5).

Lemma 2 provides operations to minimize the Lyapunov drift in (7) to achieve the maximum queue stability region. With this insight, the feedback filtering control problem is as follows.

Feedback Filtering Control Problem (FFCP): Observing the current queue length Q(t), users feedback their CSI according to the probability vector $p^*(Q(t)) = \{p^*_1(Q(t)), \ldots, p^*_K(Q(t))\}$, where $p^*(Q(t))$ is obtained from the solution of the following optimization problem, $$\max_{\{0 \le p_k \le 1\}} E\left[\sum_{k=1}^{K} Q_k(t)R_k(Q, H, c) - VS(Q(t))\right]. \quad (10)$$

The parameter V in (10) balances the average queue length (delay) with the feedback cost. A large parameter V, for example, reduces the average feedback cost in (9) but results in a larger average queue length (8). Note that due to the feedback filtering variable $c \in \{0,1\}^K$, an exponential complexity with respect to K is established to evaluate the expectation in (10). Described below, the solution of the FFCP problem is derived by exploiting the specific problem structure.

Figure 5:
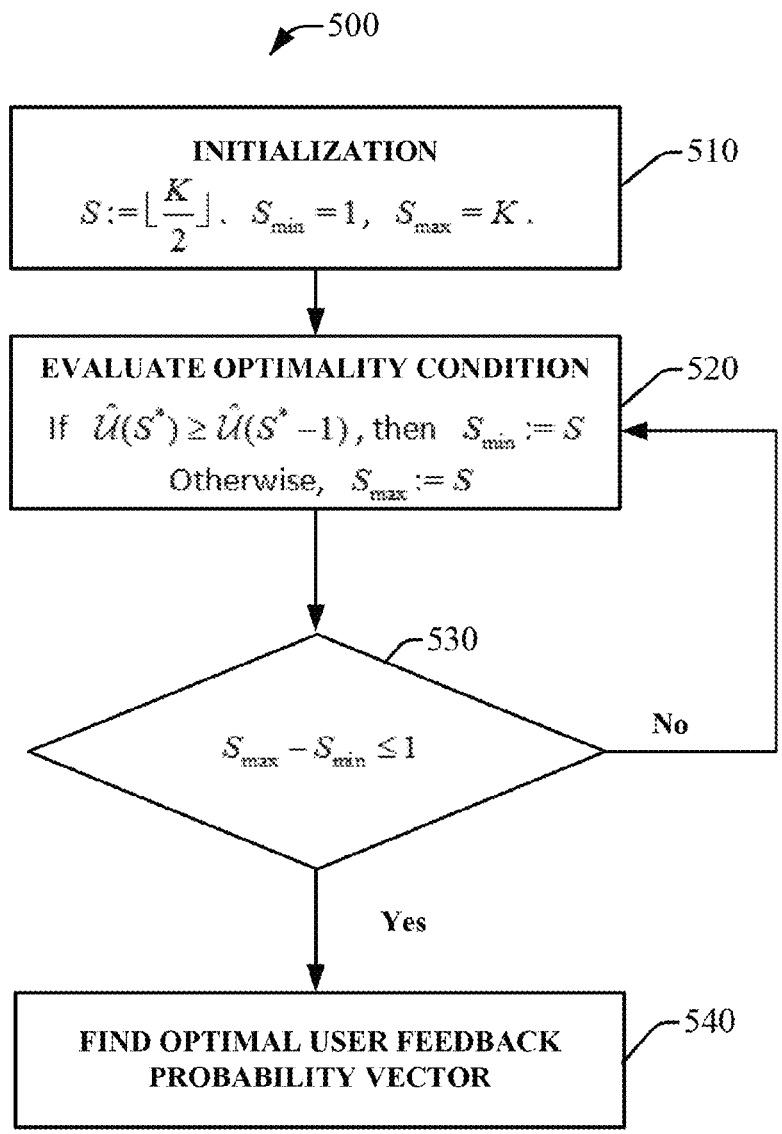
FIG. 5 illustrates a flow diagram depicting a method in accordance with an embodiment.

Referring now to FIG. 5, illustrated is a process flow for solving the FFCP problem in equation 10 above. The FFCP is decomposed into two-level subproblems, in which their properties are studied. The optimal solution is then generated to the inner problem and a low complexity algorithm derived to find an approximate solution to the outer problem.

Using primal decomposition techniques, equation (10) can be transformed into the following two subproblems Inner subproblem:

$$W(S) = \max_{[p_k]} E\left[\sum_{k=1}^{K} Q_k(t)R_k(Q, H, c)\right] \quad (11)$$

subject to: $0 \le p_k \le 1, \forall k = 1, \ldots, K$ \quad (12)

$$\sum_{k=1}^{K} p_k = S \quad (13)$$

where S is an auxiliary variable with the meaning of the average feedback cost (the number of feedback users).

Outer subproblem:

$$\max_{S} W(S) - VS. \quad (14)$$

The objective function (11) of the inner problem can be written as $$E\left\{E\left[\sum_{k=1}^{K} Q_k(t)R_k(Q, H, c) \mid c\right]\right\} = \sum_{j=1}^{2^K} w_j(Q) Pr(c = c^{(j)})$$

where $w_j(Q) = E_H[\sum_{k=1}^{K} Q_k(t)R_k(Q,H,c)|c^{(j)}]$ is a deterministic parameter independent of $\{p_k\}$, and $$Pr(c = c^{(j)}) = \prod_k p_k^{\chi_k^{(j)}}(1 - p_k)^{\chi_k^{(j)}}$$

is the probability of a particular feedback indicator vector $c^{(j)}$, $j=1, \ldots, 2^K$.

The above expression is a posynomial with respect to $\{p_k\}$. Moreover, the constraints (12)-(13) are monomials. Therefore, the inner problem is a geometric programming (GP). An advantageous property of a GP is that a local optimum is also a global optimum. However, it is almost impossible to solve (11) following the standard GP techniques, as it contains $2^K$ terms and the closed form expressions $w_j(Q)$ may not be available either. In the following, an optimal solution of the inner problem can be found by exploiting the specific structure.

Let $\Pi = \{\pi(1), \ldots, \pi(K)\}$ be a permutation of Q such that $Q_{\pi(1)} \ge Q_{\pi(2)} \ge \ldots \ge Q_{\pi(K)}$. The optimal solution of the inner problem under the average feedback amount $E[\Sigma \chi_k] = \Sigma_k p_k = S$ was found as follows.

Theorem 1 (the Optimal Solution to the Inner Problem)
The feedback probability $\{p_k\}$ to solve (11) is given by $$p_{\pi(k)} = 1, \quad 1 \le k \le \lfloor S \rfloor \quad (15)$$

$$p_{\pi(k_0)} = S - \lfloor S \rfloor, \quad k_0 = \lfloor S \rfloor + 1 \quad (16)$$

$$p_{\pi(k)} = 0, \text{ otherwise.} \quad (17)$$

Proof. Please refer to Appendix A for the proof.

Although it might seem to be better to allow more than S users to feed back (each with lower $p_k$) in order to boost up the opportunistic utility in stage II, the above result shows that the best strategy is actually allowing only the users with the S largest queues to feed back, while keeping the others inactive.

Solution to the Outer Subproblem:
To derive the optimal feedback cost, the mean data rate $E[R_k(Q,H,c)]$ (denoted as $\bar{R}_k$) in the utility function (11) is analyzed. The average data rate for user K can be defined as $\eta_k(S) \triangleq E[R_k(Q,H,c)|\chi_k=1, \Sigma_k \chi_k = S]$ conditioned on the feedback amount being $|F|=S$, where $\eta_k(S)$ is characterized in the following lemma.

Lemma 3 (Data Rate Under Heavy Traffic Approximation)
Given the set of feedback users F, where $|F|=S$. If $$\frac{Q_{\pi(1)}}{Q_{\pi(S)}} \approx 1,$$

then for $k \in F$, $$\eta_k(S) \approx M \int_0^{\infty} \log(1 + x) Nf(x) F(x)^{NS-1} dx \triangleq \hat{\eta}(S) \quad (18)$$

where $$F(x) = 1 - \frac{e^{-x/P}}{(1+x)^{M-1}}. \quad (19)$$

is the cumulative distribution function (CDF) of $SINR_{k,n}^i$ in (2) and $f(x)$ is the corresponding probability distribution function (PDF).

Proof. Please refer to Appendix B below for the proof.
The approximation is accurate when the ratio $$\frac{Q_{\pi(1)}}{Q_{\pi(S)}}$$

is close to 1, which means all the feedback users have comparable queue lengths. This can usually happen in heavy traffic scenario where most of the users (user devices) have large queues. As such:

$$W(S) = E\left[\sum_{k=1}^{\lfloor S \rfloor} Q_{\pi(k)} R_{\pi(k)} \mid \chi_{\pi(k_0)} = 0\right](1 - p_{\pi(k_0)}) + \qquad (20)$$

$$E\left[\sum_{k=1}^{\lfloor S \rfloor + 1} Q_{\pi(k)} R_{\pi(k)} \mid \chi_{\pi(k_0)} = 1\right] p_{\pi(k_0)} \approx$$

$$\sum_{k=1}^{\lfloor S \rfloor} Q_{\pi(k)} \hat{\eta}(\lfloor S \rfloor)[1 - (S - \lfloor S \rfloor)] +$$

$$\sum_{k=1}^{\lfloor S \rfloor + 1} Q_{\pi(k)} \hat{\eta}(\lfloor S \rfloor + 1)(S - \lfloor S \rfloor) \triangleq \hat{W}(S).$$

and an approximation is obtained to the outer problem (14) as $$\max_{S \leq K} \hat{U}(S) \triangleq \hat{W}(S) - VS. \qquad (21)$$

Problem (21) is concave and has a nice property as shown in the following.

Theorem 2 (Solution Property of Outer Sub-Problem (21))

The objective function $\hat{U}(S)$ in (21) is concave. Moreover, the optimal solution $S^*$ is an integer.

Proof. Please refer to Appendix C for the proof.

Theorem 2 suggests that a bisection algorithm can be applied to find the unique solution $S^*$ in (21) in at most $\log_2(K)$ steps, where the optimality condition can be expressed as $$\hat{U}(S^*) \geq \hat{U}(S^*+1) \text{ and } \hat{U}(S^*) \geq \hat{U}(S^*-1) \qquad (22)$$

for a unique $S^* \in \{1, \ldots, K\}$.

Using Theorem 1 for solving the inner problem and the optimality condition (22) for solving the outer problem (14) under heavy traffic approximation, the method 500 summarizes the Feedback Filtering Control Algorithm (FFCA), which finds the feedback probability vector $\{p^*_k\}$ in Stage I of the feedback filter component 202. For example, at 510 the method is initialized and $$S := \left\lfloor \frac{K}{2} \right\rfloor, S_{min} = 1, S_{max} = K.$$

At 520, an evaluation of the condition in equation (22) is generated for the optimality condition. If $\hat{U}(S^*) \geq \hat{U}(S^*-1)$, then $S_{min}:=S$. Otherwise, $S_{max}:=S$. At 530, a decision is made as to whether $S_{max} - S_{min} \leq 1$. If not, then the process at 520 is repeated by setting $S:=\lfloor (S_{min}+S_{max})/2 \rfloor$, until $S_{max} - S_{min} \leq 1$. If yes, then the method continues to 540 where optimal user feedback probability vector p is found according to equation (15) in Theorem 1, by setting $S=S^*$.

The proposed two-timescale user scheduling method 500 can be summarized as follows. Choose the optimal user feedback amount $S^*$ by solving (14) using the FFCA. Secondly, choose $S^*$ users who have the longest queues among all the K users to feedback to the BS according to the policy decision $\{p^*_k(Q)\}$ in (15). Thirdly, the selected users feedback their effective SINRs based on $\{p^*_k(Q)\}$, and the BS schedules the users to maximize the queue-weighted throughput as described in the stage II policy.

Although the FFCA is derived using heavy traffic approximation, it is in fact throughput optimal as summarized below.

Theorem 3 (Throughput Optimality of the FFCA)

Suppose $\{H_k(t)\}$ are i.i.d. over k and t. The feedback control $p^*(Q)$ given by FFCA achieves the maximum stability region C in the MU-MIMO system.

Proof. Please refer to Appendix D for the proof.

The methodologies are described herein in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 6:
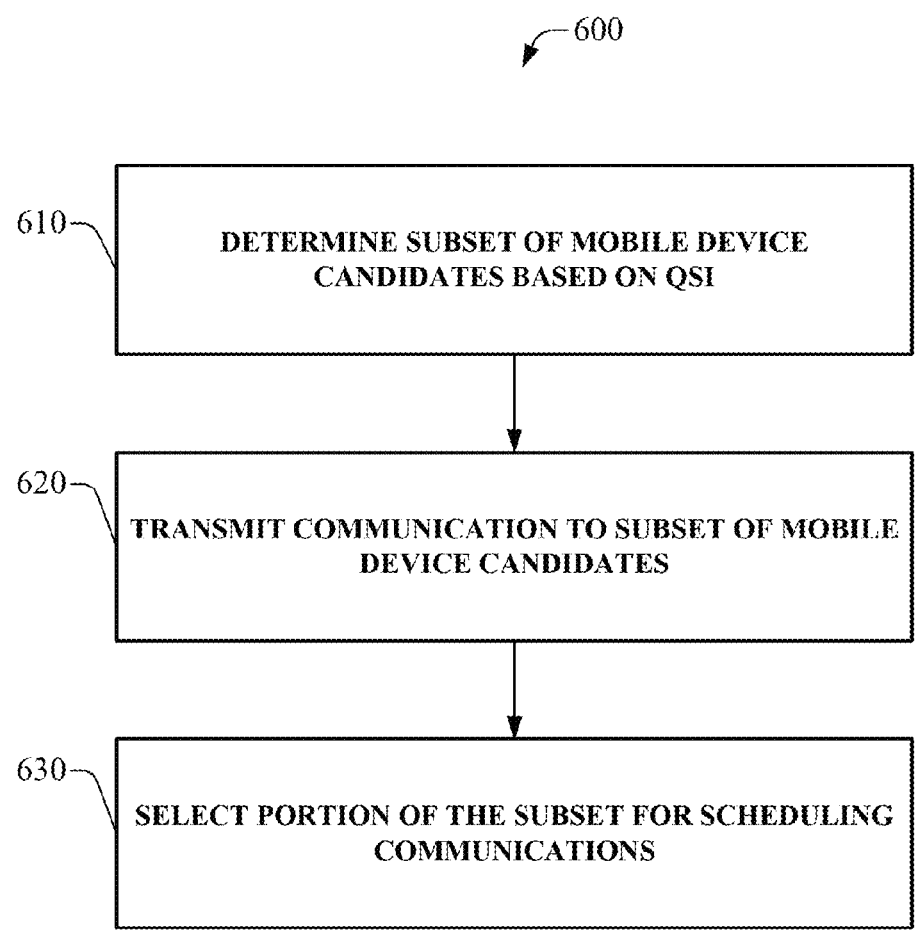
FIG. 6 illustrates a flow diagram depicting a method in accordance with an embodiment.

Referring now to FIG. 6, a method 600 for filtering and scheduling communication in a MU-MIMO channel of a set of network devices. At 610, the method 600 comprises determining, by a system comprising a processing device, a subset of mobile device candidates from among a set of mobile device candidates based on QSI of a plurality of mobile device queues for a plurality of transmitters and receivers communicatively coupled in a multiple input multiple output channel. At 620, a communication is transmitted to the subset of mobile device candidates that initiates feedback comprising channel state information from the subset of mobile device candidates in the plurality of mobile device queues. The transmitting of the communication, for example, can comprise generating a random beam that supports near-orthogonal data stream transmissions to the subset of mobile device candidates prior to obtaining knowledge of a global channel state information for the set of mobile device candidates.

At 630, the method further comprises selecting a portion of the subset of mobile device candidates for scheduling communications via the multiple input multiple output channel.

In an aspect the method 600 can further comprise receiving the feedback from the subset of mobile device candidates in the plurality of mobile device queues, wherein the selecting the portion of the subset of mobile device candidates is based on the channel state information received.

Figure 7:
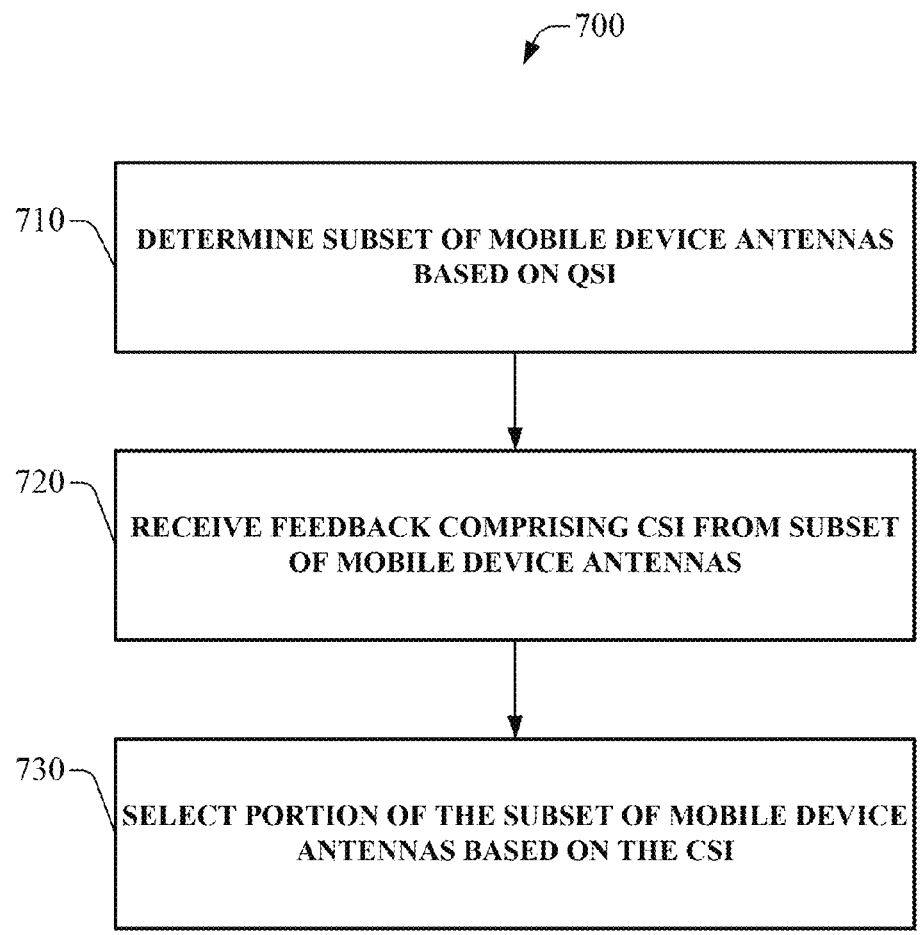
FIG. 7 illustrates a flow diagram depicting a method in accordance with an embodiment.

Referring now to FIG. 7, illustrated is a method 700 for filtering and scheduling communication for a MU-MIMO channel of a network. At 710, the method comprises determining a subset of mobile device antennas from a set of mobile device antennas based on queue state information of a multi user queue of a MIMO channel. At 720, a set of feedback is received that comprises channel state information from the subset of mobile device antennas of the multi user queue. At 730, a portion of the subset of mobile device antennas is selected based on the channel state information.

In another aspect, the method includes transmitting a communication to the subset of mobile device antennas that enables the subset of mobile device antennas having a queue delay length that satisfies a queue delay length condition among the set of mobile device antennas to communicate the set of feedback. The method can further comprise scheduling the portion of the subset of mobile device antennas to transmit with a set of beams corresponding to a maximum effective signal-to-interference-plus noise ratio associated with the portion of the subset of mobile device antennas. A feedback cost and a maximum queue stability region can be determined based on the feedback cost for the set of mobile device antennas of the multi user queue, and the set of feedback can be received from the subset of mobile device antennas according to a set of probability vectors.

Figure 8:
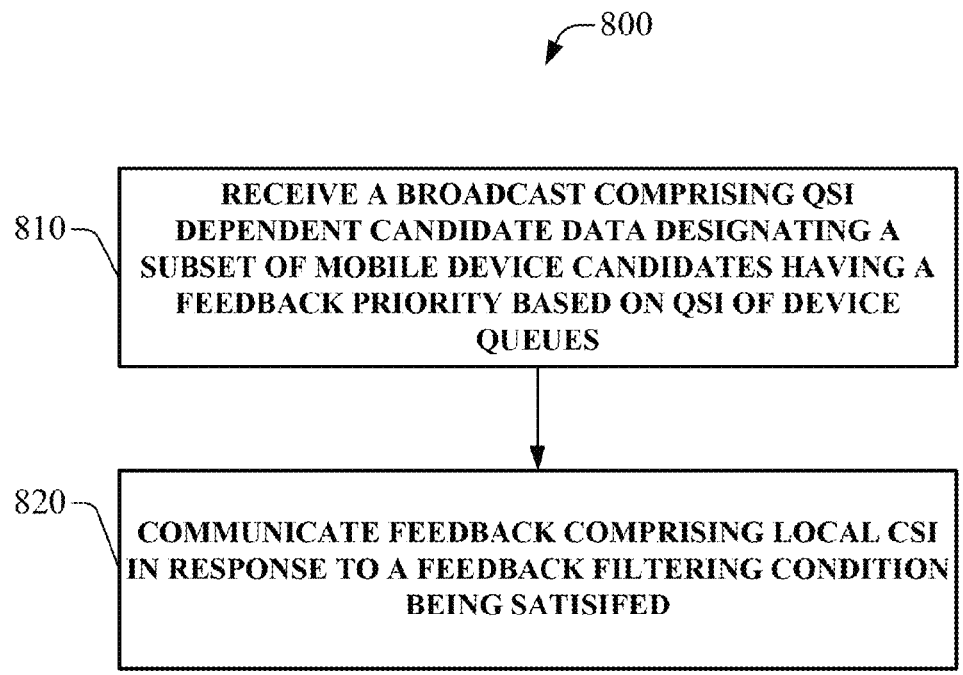
FIG. 8 illustrates a flow diagram depicting a method in accordance with an embodiment.

FIG. 8 illustrates a method 800 for a queue aware MU-MIMO system with different time scales for mobile driven feedback. At 810, the method 800 comprises receiving a broadcast comprising a queue state information dependent feedback candidate data (e.g., probability data) designating a subset of mobile device candidates having a feedback priority from among a set of mobile device candidates based on a set of queue state information of a plurality of mobile device queues for a multiple input multiple output channel. At 820, feedback is communicated comprising local channel state information in response to a feedback filtering condition (a probability or feedback probability) being satisfied. In response to the feedback filtering condition being satisfied, a signal-to-interference-plus noise ratio can be determined for a set of antennas. Additionally, in response to the feedback filtering condition being satisfied, a strongest beam is selected based on signal-to-interference-plus noise ratios from among a set of antennas. The feedback, for example, can also comprise a beam index for the strongest beam and a corresponding signal-to-interference-plus noise ratio.

Large Deviation Delay Analysis for the Worst Case User

In this section, the queuing delay performance of the proposed solution is described and the gain of having queue-aware policy is illustrated. The steady state distribution of the worst case queuing performance can be expressed as:

$$\lim_{t \to \infty} Pr\left(\max_{1 \leq k \leq K} Q_k(t) > B\right)$$

where B is the buffer size. The maximum queue length process is denoted $Q_{max}(t)=\max_k Q_k(t)$ and $Q_{max}(\infty)$ denoted as the steady state of the $Q_{max}(t)$. To overcome the technical challenges associated with delay analysis of MU-MIMO system, the large deviation approach is considered. Specifically, the asymptotic overflow probability is considered for the maximum queue $Q_{max}(\infty)$ over a large buffer size B, which is captured by the large deviation decay rate of the tail probability of $Q_{max}(\infty)$. In the next section, the decay rate function for $Q_{max}(\infty)$ is introduced.

Large Deviation Decay Rate for $Q_{max}(\infty)$ Using Sample Path Analysis

The large deviation decay rate function I* for the tail probability of $Q_{max}(\infty)$ can be expressed as:

$$I^* \triangleq \lim_{B \to \infty} -\frac{1}{B} \log Pr(Q_{max}(\infty) > B). \quad (23)$$

Note that, with the notion of the large deviation rate function, the queue overflow probability can be expressed as:

$$Pr(Q_{max}(\infty) > B) = e^{-I^*B + o(B)} \quad (24)$$

where the component I* controls how fast the queue overflow probability drops when the buffer size B grows. A larger decay rate I* corresponds to a better performance of the scheduling algorithm by reducing the worst case delay $Q_{max}$ in the system.

To find the large deviation decay rate I*, the packet departure process is generated as $D_{max}(t)$ associated with the maximum queue $Q_{max}(t)$. Denote $D_{max}(t)=R_{max}(t, Q(t))/L$, where $R_{max}(t, Q(t))$ is the transmission data rate in bits. Define the τ-range logarithm moment generating function (LMF) as $$\Lambda_D^\tau(\theta) = \frac{1}{\tau} \log E\left[\exp\left(\theta \sum_{t=1}^{\tau} D_{max}(t)\right)\right].$$

A "near i.i.d." property for the departure process $D_{max}(t)$ is considered, which is captured in the following.

Assumption 3 (Existence of the LMF)

The limit of the τ-range LMF exists as an extended real number $R \cup \{+\infty\}$ for each $\theta \in R$, i.e., $\lim_{\tau \to \infty} \Lambda_D^\tau(\theta) @ \Lambda_D(\theta)$.

A simple example to satisfy the above assumption is $D_{max}(t)$ being i.i.d., where $\Lambda_D^\tau(\theta) = \Lambda_D(\theta) = \log E[\exp(\theta D_{max})]$.

For ease of discussion, consider i.i.d. arrivals $A_k(t)$ with mean $E[A_k]=\lambda$ and LMF $\log \psi_{A,k}(\theta) \triangleq \Lambda_A(\theta)$. Denote $g(x,\theta) = \Lambda_A(\theta) + \Lambda_D(x, -\theta)$, where x represents some system state according to the scheduling policy. A sample path analysis is carried out as follows.

Consider a scaled sample path $$q_{max}^B(t) = \frac{1}{B} Q_{max}(\lfloor Bt \rfloor),$$

which starts from $q_{max}^B(0)=0$ and reaches $q_{max}^B(T_s)=1$, for some $T_s$. With the scaling, $Pr(Q_{max}(\infty)>B)=Pr(q_{max}^B(\infty)>1)$. Let w(t) be a continuous sample path following $q_{max}^B(t)$, as $w(t) \approx q_{max}^B(t)$. The rate function $I_0$ is defined as $$I_0 = \inf_{w(-)}\left\{\int_0^{T_s} l(w(\tau), w'(\tau)) d\tau : w(0) = 0, w(T_s) = 1, T_s > 0\right\} \quad (25)$$

where $$l(x = w(\tau), y = w'(\tau)) \triangleq \sup_\theta \{\theta y - g(x, \theta)\}$$

is the local rate function. As an intuitive illustration, $I_0$ corresponds to finding a "least cost" path w*(t) that goes overflow at $w(T_s)=1$. In other words, the $q_{max}^B(t)$ "most likely" follows the path w*(t) to overflow, if it does.

The $I_0$ defined above is connected with the large deviation principle of $Q_{max}(\infty)$ in the following results.

Theorem 4 (the Large Deviation Principle for $Q_{max}(\infty)$)

Suppose $g(x, \theta)$ is Lipschitz continuous on $x \in [0, 1]$. Then $$\lim_{B \to \infty} \frac{1}{B} \log E[Pr(q_{max}^B(\infty) > 1)] = -I_0.$$

In addition, assume that l(x, y) in (25) is differentiable in y at all x, which is non-degenerate in [0,1]. For each x, the equation g(x,θ*(x))=0 has at most two solutions. Then with the appropriate choice of θ*(x), $$I_0 = \int_0^1 \theta^*(x)dx. \quad (26)$$

Proof. Please refer to Appendix E for the proof.

As an application example for the above result, the rate function can be calculated for a CSI-only baseline scheduling algorithm: Each user k feeds back the SINR for the $i^*(k,n)$-th beam on each antenna n, where $i^*(k,n) = \arg\max_{1 \leq i \leq M} SINR_{k,n}^i$. On the other hand, the BS schedules the user with the highest SINR on each beam i, for i=1, ..., M. Consider i.i.d Poisson arrivals A(t) with parameter $\lambda = \lambda_{tot}/K$, and i.i.d. CSI $\{H_k\}$. The results are as follows.

Corollary 1 (Decay Rate for the CSI-Only Algorithm)
Assume $$\mu_b \triangleq \frac{M\log(P\log NK)}{KL} > \lambda.$$

The large deviation decay rate for $Q_{max}(\infty)$ under the CSI-only baseline algorithm can be expressed as $$I^*_{baseline} \approx \log\frac{M\log(P\log NK)}{\lambda_{tot}L}. \quad (27)$$

which is asymptotically accurate at large M and K.

Proof. Please refer to Appendix F for the proof.

The above result shows that the CSI-only baseline algorithm has a decay rate $I^*_{baseline} = O(\log \log \log K)$. By taking into account the QSI in the user scheduling, it will be shown later that the proposed two-timescale algorithm achieves a much larger decay rate of the overflow probability.

Asymptotic Data Rate of the Proposed Algorithm

To derive the large deviation decay rate I* for $Q_{max}(t)$ under the proposed algorithm, an understanding of the corresponding packet departure rate $D_{max,p}(t)$ is needed. Denote $D_{max,b}(t; S)$ as the packet departure rate under the CSI-only algorithm for a group of S users. The following property is generated.

Lemma 4 (Property of $D_{max,p}(t)$) Given |F|=S users feedback:

$$D_{max,b}(t; S) \leq D_{max,p}(t; S) \leq \frac{1}{L}\sum_{n=1}^{N}\log\left(1 + SINR_{m(t),n}^{i^*(n)}\right) \quad (28)$$

where $SINR_{m(t),n}^{i^*(n)}$ is the SINR on the n-th receive antenna of the k=m(t) user device that has the longest queue and feeds back the $i^*(n)$-th beam.

The left hand side of (28) is due to the fact that the maximum queue user has a higher probability to get scheduled under the Stage II queue-weighted scheduling policy. The equality holds when all the feedback users have similar queue length, i.e., $Q_{\pi(1)} = Q_{\pi(S)}$. The equality on the right hand side of (28) holds when the maximum queue user has dominating queue length, i.e., $Q_{\pi(1)} \gg Q_{\pi(2)}$, and hence must be scheduled.

In addition, the following result for evaluating the feedback amount S* is derived.

Lemma 5 (Upper bound of S*)
The upper bound of S*(t) which solves (21) is given by $$S^*(Q(t);K) \leq \min\{e^{W(c_1)}N, K\} \triangleq \hat{S}^*(Q_{max}) \quad (29)$$

where $$c_1 = \frac{MNQ_{max}}{V},$$

and W(x) is the Lambert W function defined as $W(x)e^{W(x)} = x$. The equality holds when $Q_{\pi(k)} = Q_{max}$ for all k.

Proof. Please refer to Appendix G for the proof.

Remark 1 (Interpretation of S*)

The results provide an important insight that, when $Q_{max}$ is large, it is better to have more user feedback to boost up the system throughput. On the other hand, when $Q_{max}$ is small, less user feedback is possible and higher priorities can be given to the urgent users.

With the results of Lemma 4 and 5, the packet departure rate can be obtained for $Q_{max}(t)$. The large deviation decay rate for the proposed algorithm is discussed in the next subsection.

Rate Function for the Proposed Algorithm Under T=1

To gain more insight from the general results in Theorem 4, a special case can be considered where the CSI $\{H_k\}$ are i.i.d., and the arrivals $A_k$ follow the Poisson distribution with parameter $\lambda_k = \lambda = \lambda_{tot}/K$.

The case T=1 is considered, where the BS broadcasts the updated feedback policy $\hat{p}_k(Q)$ at every time slot. The following results for the large deviation decay rate of $Q_{max}(\infty)$ under the proposed two-timescale user scheduling algorithm are obtained.

Theorem 5 (Decay Rate for the Proposed Algorithm)
Let $$\mu_p(x) = \frac{M\log(P\log N\hat{S}^*(x))}{L\hat{S}^*(x)}.$$

Assume that $\lambda < \inf_{x \in [0,1]} \mu_p(x)$. Then the large deviation decay rate of $Q_{max}(\infty)$ under the two-timescale user scheduling algorithm can be expressed as $$I^*_{prop} \geq (1-\varepsilon)\log K + \log\frac{M}{\lambda_{tot}L} + \varepsilon\log r_0 + C \triangleq I^{LB}_{prop} \quad (30)$$

where $\varepsilon > 0$ is a small constant, $r_0 = \int_0^1 \log(1+x)dF(x)$, and $$C = \int_\varepsilon^1 \left\{\log\left[N\log\left(PW\left(\frac{MNx}{V}\right)\right)\right] - W\left(\frac{MNx}{V}\right)\right\}dx.$$

Proof. Please refer to Appendix H for the proof.

Based on the results in Corollary 1 and Theorem 5, the following for the CSI-only user scheduling algorithm and the proposed two-timescale algorithm is generated.

Gain of the queue-aware policy: Large deviation decay rates $I^*_{prop} \gg I^*_{baseline}$, when the number of users K grows large. This demonstrates that it is important to utilize the queue information in the user scheduling algorithm to minimize the worst case delay.

Impact of the multi-user diversity: In addition, both of the schemes benefit from the increase of the number of users K, as seen from the terms log(P log NK) in (27) and log(K) in (30). The decay rate increases when the number of users increases, and the rate $I^*_{prop}$ increases faster than the baseline.

Impact of the multi-antenna transmission: Furthermore, both of the schemes benefit from the MU-MIMO channel. It is demonstrated that, when increasing the number of data streams M and the receive antennas N, the large deviation decay rates $I^*_{prop}$ and $I^*_{baseline}$ both increase as O (log M log log N).

In summary, by carefully exploiting the queue information in the stage I feedback filtering, the proposed MU-MIMO algorithm has significant delay performance gain compared with conventional CSI-only schemes.

Rate Function for T>1

The T-step feedback policy is now considered, where the BS updates the $\hat{p}_k(Q)$ for every T>1 time slot. The corresponding maximum queue process is denoted as $Q_{max}^{(T)}(t)$. The case where the process $Q_{max}^{(T)}(t)$ is stable and assumes that the large deviation principle exists is considered.

Define the rate function as $$I_{prop}^{(T)*} \triangleq \lim_{B \to \infty} -\frac{1}{B} \log Pr(Q_{max}^{(T)}(\infty) > B).$$

For easy discussion, i.i.d. arrivals $A_k(t)$ and i.i.d. CSI $\{H_k(t)\}$ are considered. Considering a random process $v(t) = A_1(t) - A_2(t) - d(t)$, where $A_1$ and $A_2$ are two i.i.d. arrival sequences, d(t) has probability distribution function given by F ($P^{-1}(2^x-1)$) and F(x) is defined in (19). The following result are obtained for the decay rate of the T-step feedback policy.

Theorem 6 (Decay Rate for the T-Step Feedback Policy)

Assuming the conditions in Theorem 5, $$I_{prop}^{(T)*} \geq I_{prop}^{LB} - \int_0^1 \rho(x) \, dx$$

where $\rho(x) \triangleq -\frac{1}{\hat{\mu}_p(x) - \lambda} \log\left(e^{\hat{\mu}_p(x)-\lambda} - \left(e^{\hat{\mu}_p(x)-\lambda} - 1\right)P_0^T\right)$ and $$P_0^T \triangleq Pr\left\{\sum_{\tau=1}^{T-1} v(\tau) > 0\right\}.$$

Proof. Please refer to Appendix I for the proof.

Remark 2 (Impact of T and the Arrival Distribution)

Note that $P_0^T$ represents a lower bound probability for the maximum queue user remaining in the outdated feedback group F ($t_0$) during $t \in [t_0, t_0+T)$; the larger the T, the smaller the $P_0^T$. The lower bound becomes tight when $P_0^T$ is close to 1. The above result shows that the decay rate function $I_{prop}^{(T)*}$ decreases when the QSI update period T increases. Moreover, the distribution of arrival plays an important role in T>1. With a heavier tail for the arrival, $P_0^T$ decreases, resulting in a higher performance penalty for T>1. Finally, the performance in terms of the overflow probability for the two-timescale algorithm is sensitive to the timely queue-aware feedback under heavy loading when $\hat{\mu}_p - \lambda$ is small.

Numerical Results

In this section, the queuing delay performance of the proposed two-timescale user scheduling algorithm is simulated. A MU-MIMO system is considered with K users, and packets arrive at the queue of each user according to a Poisson distribution with rate $\lambda = \lambda_{tot}/K$, where the total arrival rate is $\lambda_{tot} = 7500$ packets/second. Each packet has L=8000 bits. The system bandwidth is 10 MHz and the SNR is 10 dB. The number of transmit and receive antennas are M=4 and N=2, respectively. The scheduling time slot is $\tau=1$ ms and the simulation is run over $T_{tot}=100$ seconds. The performance of proposed algorithm is compared against the following reference baselines.

Baseline 1: CSI-only user scheduling (CSIO). At each time slot, all the users feedback the CSI to the BS, and the BS schedules a set of users who respectively have the highest SINR on each beam Baseline 2: CSI-only user scheduling with limited feedback (CSIO-LF). The scheme is similar to baseline 1 except that the user feeds back to the BS only when its SINR exceeds a threshold $t_{siNR}=1$ dB.

Baseline 3: Proportional fair user scheduling (PFS). At each time slot, all the users feedback the CSI to the BS, and the BS transmits data to the users using proportional fair scheduling with window size $t_w=100$ ms.

Baseline 4: Max weighted queue user scheduling (MWQ). At each time slot, all the users feedback their CSI to the BS, and the BS selects a set of users so that the instantaneous queue-weighted sum rate $\Sigma Q_k R_k$ is maximized.

Note that the associated user scheduling problem in baseline 4 has much higher complexity for user scheduling and feedback from all the users are required. Hence, baseline 4 serves for performance benchmarking purpose only.

Queuing Performance and Feedback Comparisons

Figure 9:
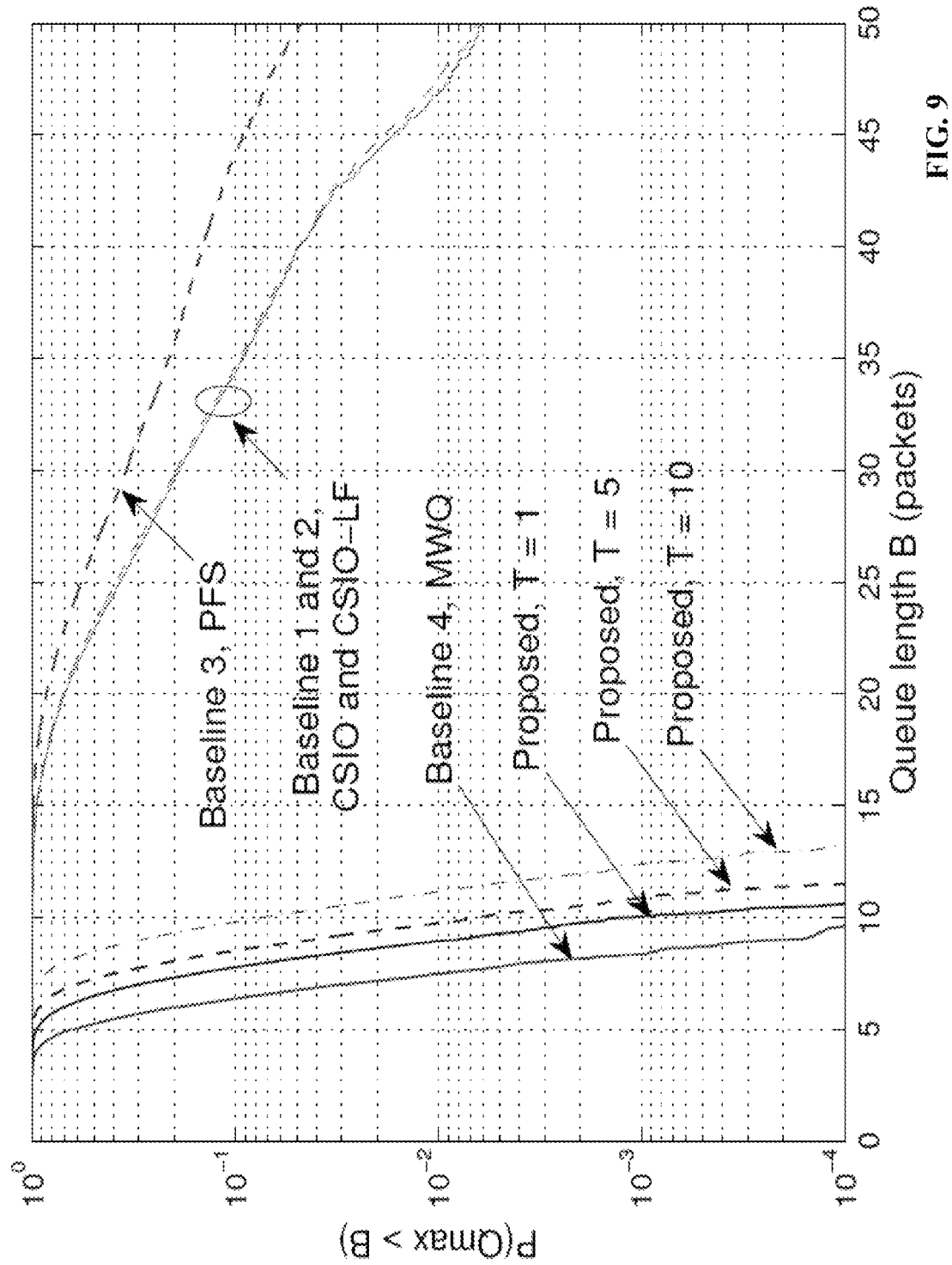
FIG. 9 illustrates a chart depicting an overflow probability versus a buffer size in accordance with an embodiment.

FIG. 9 shows the overflow probability for the worst case queue $Pr(Q_{max}(\infty)>B)$ versus the buffer size B. The number of users is K=40. The feedback policy c updates on every T=1,5,10 time slots. The proposed scheme significantly outperforms over baselines 1-3. It also has similar performance as baseline 4.

FIG. 9 demonstrates the average feedback amount $\bar{S}$ (defined as the average number of users feedback to the BS at each time slot) versus the number of users K. The feedback amount of the proposed scheme is less than those of all the baselines. Note that although baseline 4 has a smaller worst case queue, it requires all the users feedback to the BS. FIG. 9 illustrates the overflow probability for the worst case queue $Pr(Q_{max}(\infty)>B)$ versus the buffer size B. The number of users is K=40. The feedback policy c in stage I updates on every T=1, 5, 10 time slots. The proposed scheme significantly outperforms over baselines 1-3. It also performs closely to baseline 4.

Figure 10:
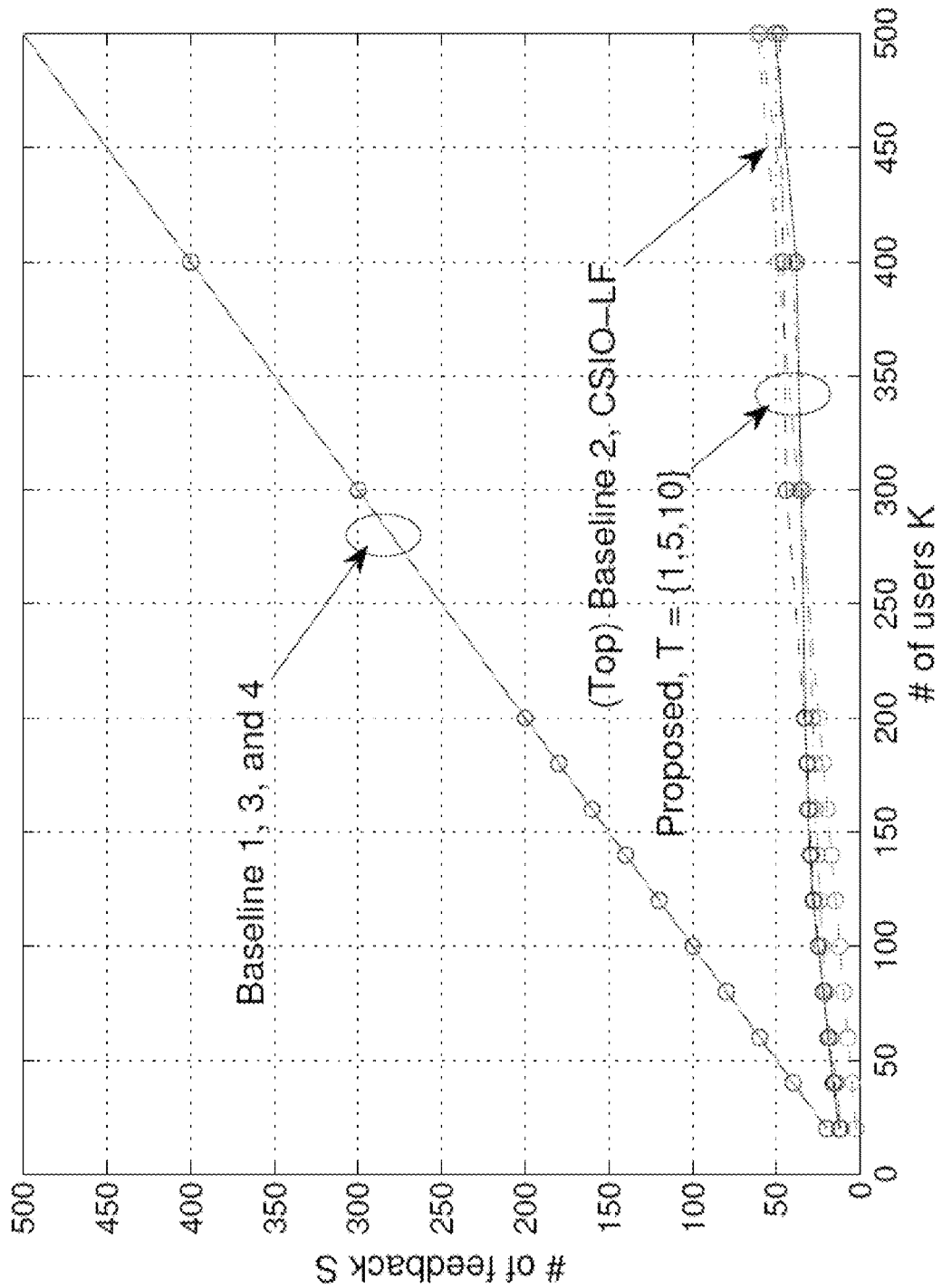
FIG. 10 illustrates a chart depicting an average feedback amount versus a number of users in accordance with an embodiment.

FIG. 10 illustrates the average feedback amount $\bar{S}$ versus the number of users K. The feedback threshold of baseline 2 is $t_{SINR}=1$ dB. The feedback amount of the proposed scheme is much less than those of all the baselines. Note that although baseline 4 (MWQ) has a smaller worst case queue, it requires all the users feedback to the BS.

Figure 11:
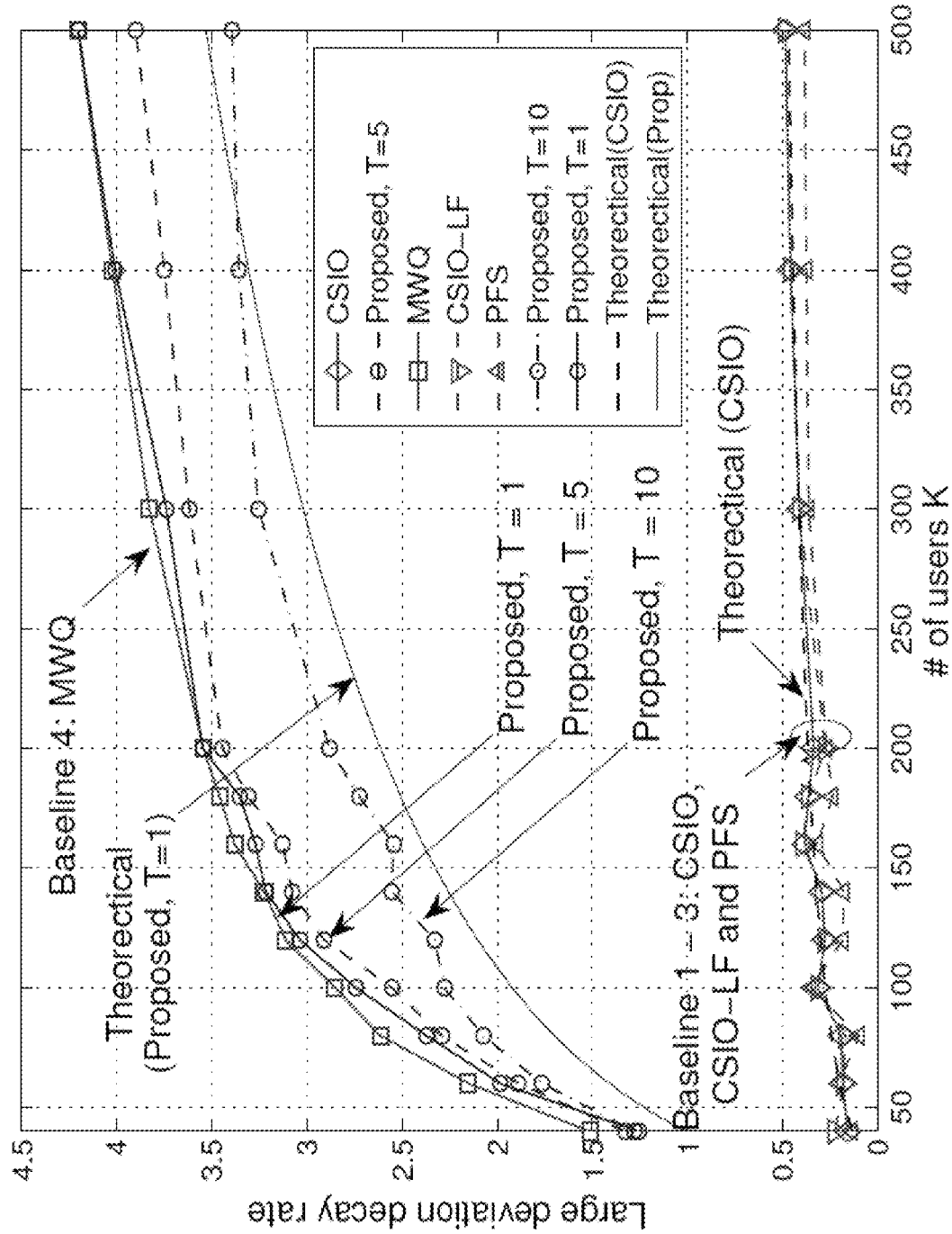
FIG. 11 illustrates a chart depicting a large deviation decay rate versus a number of users in accordance with an embodiment.

FIG. 11 illustrates the large deviation decay rate over the number of users. The decay rate for the proposed scheme grows much faster than that of baselines 1-3 with the number of users K. Moreover, the theoretical rate functions are plotted. These are consistent with the results in Corollary 1 and Theorem 5. Note that although baseline 4 performs the best, it requires all the use feedback to the BS.

A novel two-timescale delay-aware user scheduling algorithm is thus demonstrated and generated by systems and methodologies herein for the MU-MIMO system. The policy consists of a queue-aware mobile-driven feedback filtering stage and a dynamic queue-weighted user scheduling stage. The queue-aware feedback filtering control algorithm in stage I is derived through solving an optimization problem. Under the proposed two-timescale user scheduling algorithm, the queuing delay performance is evaluated for the worst case user using the sample path large deviation analysis. The large deviation decay rate for the proposed algorithm, scaled as O (log K), was shown to be much larger than a CSI-only user scheduling algorithm, which means that the proposed scheme performs better in reducing the worst case delay. The numerical results demonstrated a significant performance gain over the CSI-only algorithm and a huge reduction in feedback over the MWQ algorithm.

Appendix A Proof of Theorem 1

Note that the amount of feedback $s=\Sigma_k \chi_k$ follows the Poisson Binomial distribution, which is insensitive of individual $p_k$ given a fixed $\Sigma_k p_k = S$. For an easy elaboration, consider a Poisson distribution (which is close to the Poisson Binomial distribution) with parameter $\Sigma_k p_k = S$ to approximate the distribution of s. The approximation error is upper bounded by $2\Sigma_k p_k^2$.

The optimal solution is first found under the heavy traffic approximation, and the result is generalized into the normal case. In the heavy traffic case where $Q_{\pi(1)} \approx Q_{\pi(K)}$, the objective in (11) can be written as $$f(p) = \Sigma_k Q_k(t) E[\chi_k \eta(s)] = \Sigma_k Q_k E\{E[\chi_k \eta(s) | \chi_k]\} \approx \Sigma_k p_k Q_k E\eta(s),$$

where $E[\chi_k \eta(s) | \chi_k] = p_k E\eta(s) + o(\Sigma_k p_k) \approx p_k E\eta(s)$, and $\eta(s)$ does not depend on Q since all $Q_k$ are almost the same. Thus $E\eta(s)$ can be computed by an approximated Poisson distribution which does not depend on $\chi_k$.

As such, the inner subproblem becomes a linear program with constraints $\Sigma p_k \leq S$ and $0 \leq p_k \leq 1$, $\forall k$. The solution is given by $p_{\pi(k)} = 1, 1 \leq k \leq \lfloor S \rfloor$, $p_{\pi(k_0)} = S - \lfloor S \rfloor$, $k_0 = \lfloor S \rfloor + 1$, and $p_{\pi(k)} = 0$, otherwise, where the permutation $\Pi = \{\pi(k)\}$ is such that $Q_{\pi(1)} \geq \ldots \geq Q_{\pi(k)}$.

Now it is shown that the above solution is also a local optimum under general queuing profiles. Consider an arbitrary feasible probability vector $\tilde{p} = p^* + p_\epsilon$ lies in a small neighborhood of $p^*$. Since $\Sigma_k \tilde{p}_k = S$, a probability of $p_0^\epsilon$ is decreased for some user $k = \pi(j)$, $j \leq S$, in order to increase a probability $p_0^\epsilon$ for a user $k' = \pi(j')$, $j' > S$. The differential utility $W(\tilde{p}; S) - W(p; S)$ then becomes $$\Delta W(S) = -p_0^\epsilon Q_k E\left[R_k \mid Q_k R_k \in \max^M \{Q_i R_i, i \in F\}\right] \times$$
$$Pr\left(Q_k R_k \in \max^M \{Q_i R_i, i \in F\}\right) +$$
$$p_0^\epsilon Q_{k'} E\left[R_{k'} \mid Q_{k'} R_{k'} \in \max^M \{Q_i R_i, i \in F\}\right] \times$$
$$Pr\left(Q_{k'} R_{k'} \in \max^M \{Q_i R_i, i \in F\}\right)$$

where $\max^M\{A\}$ means a subset of A with M elements that are the largest. Since $Q_k \geq Q'_k$, and $R_k$ and $R_{k'}$ are identical, then $Pr(Q_k R_k \in \max^M\{Q_i R_i, i \in F\}) \geq Pr(Q_{k'} R_{k'} \in \max^M\{Q_i R_i, i \in F\})$. Therefore, the differential utility cannot be positive. As $p^\epsilon$ can be arbitrary, the vector $p^*$ must achieve the local maximum utility.

Moreover, as the inner problem is a GP, $p^*$ is also a global optimum.

Appendix B Proof of Lemma 3

Consider $Q_{\pi(1)} \approx Q_{\pi(S)}$. The queue weighted user scheduling algorithm degenerates to a max-SINR based algorithm. Then the order statistics can be applied to study the expected data rate, and each user has around 1/S probability to be scheduled independently on each beam.

From the effective SINR expression in (2), as $\phi_i$ are unitary vectors, $|H_k^{(n)} \phi_i|^2$ are i.i.d. over i with chi-square distribution with degrees of freedom 2. Consequently, the term $\Sigma_{j:j\neq i} |H_k^{(n)} \phi_j|^2$ is chi-square distributed with degrees of freedom $2M-2$. Thus, the PDF $f(x)$ and CDF $F(x)$ of $SINR_{k,n}^i$ are given by $$f(x) = \frac{e^{-x/P}}{(1+x)^M}\left(\frac{1}{P}(1+x) + M - 1\right) \text{ and}$$
$$F(x) = 1 - \frac{e^{-x/P}}{(1+x)^{M-1}},$$

respectively. Thus, for a particular user $k \in F$, as $SINR_{k,n}^i$ are i.i.d. over different users k and antennas n, the probability that user k has the largest SINR on the i-th beam and the n-th antenna is give by 1/NS. The corresponding CDF of the maximum SINR is $$P\left(\max_{k \in F, 1 \leq n \leq N} SINR_{k,n}^i \leq x\right) = (F(x))^{NS} \tag{31}$$

and hence, the data rate can be given by $$\hat{R} = \int_0^\infty \log(1+x) d(F(x))^{NS}$$
$$= \int_0^\infty \log(1+x) NS f(x) F(x)^{NS-1} dx.$$

As each user equips with N antennas, the average data rate for user $k \in F$, given $|F| = S$ is $$\eta_k(S) \approx \sum_{n=1}^N \sum_{i=1}^M Pr(SINR_{k,n}^i = \max_{k_0 \in F, 1 \leq n \leq N} SINR_{k_0,n}^i) \hat{R} = NM \frac{1}{NS} \hat{R} = \hat{\eta}(s).$$

Appendix C Proof of Theorem 2

It is noted that the function $\hat{W}(S)$ is piece-wise linear and so is $\hat{U}(S)$. Then the function $\hat{U}(S)$ is concave if a smooth and concave upper envelope function that passes through every corner point of $\hat{U}(S)$ can be found.

Let I denote the space of twice-differentiable positively non-decreasing concave functions, i.e., $I\{\phi \in C^2(0,+\infty): \phi > 0, \phi' \geq 0, \phi'' \leq 0\}$. Let $\eta_c(s) = \hat{\eta}(s)$, where $\eta_c(s)$ is allowed to take real values. Given $g \in I$, define $G(s) = g(s)\eta_c(s) - V_s$. The following result is obtained.

Lemma 6 $G(s)$ is concave for any $g \in I$.

Proof. To show $G(s)$ is concave is equivalent to showing $G''(s) = g''(s)\eta_c(s) + 2g'(s)\eta'_c(s) + g(s)\eta''_c(s) \leq 0$.

From the property of $g \in I$, $g'(s) s \leq g(s)$. Thus $$G''(s) \leq g''(s)\eta_c(s) + \frac{g(s)}{s}[2\eta'_c(s) + s\eta''_c(s)]. \tag{32}$$

The first term is negative by the definition of $g \in I$. In the second term, $$\frac{g(s)}{s}$$

is positive. Now, let $\Gamma(s) = 2\eta'_c(s) + s\eta''_c(s)$. Note that, from (18), $\eta_c(s)$ is twice differentiable on $s \in (0, +\infty)$, yielding the following two equations:

$$\eta'_c(s) = M\int_0^\infty \log(1+x) N^2 f(x) \log[F(x)] F(x)^{NS-1} dx,$$

$$\eta''_c(s) = M\int_0^\infty \log(1+x) N^3 f(x) \log[F(x)]^2 F(x)^{NS-1} dx.$$

One can easily verify that, $\Gamma(s; N=1) \leq 0$ for all $s>0$. This can be seen by first numerically verifying $\Gamma(s; N=1)<0$ for small s (e.g., s<1000), and then verifying $\Gamma(s)' > 0$ for large s through analyzing the dominating components $F(x)^{S-1}$ in the integrand as $F(x)$ sufficiently close to 1. Moreover, for $s \to \infty$, $\Gamma(s; N=1) \to 0$.

For $N>1$, let $t=Ns$. From the above two equations, $\Gamma(s; N)=N^2\Gamma(t; N=1) \leq 0$. With $\Gamma(s) \leq 0$, $G''(s) \leq 0$ in (32). Hence $G(s)$ is concave.

Now notice that the sequence $\Sigma_{k=1}^{S} Q_{\pi(k)}$ is non-decreasing for $S=1, \ldots, K$, and the increment is non-increasing. Then there must exist a function $g_Q \in I$, such that $g_Q(s)$ passes throughput every point of the sequence $\Sigma_{k=1}^{S} Q_{\pi(k)}$, i.e., $g_Q(S) = \Sigma_{k=1}^{S} Q_{\pi(k)}$ for $S=1, \ldots, K$. According to Lemma 6, the function $G_Q(s) \triangleq g_Q(s)\eta_c(s) - Vs$ is concave. Moreover, $G_Q(s)$ is an upper envelope function that passes throughput every corner point of $\hat{U}(S)$. This proves that $\hat{U}(S)$ is concave.

To show the optimal solution appears at one the integer point, the derivative of $\hat{U}(S)$ is taken to obtain $$\frac{d}{dS}\hat{U}(S) = -\sum_{k=1}^{\lfloor S \rfloor} Q_{\pi(k)}\hat{\eta}(\lfloor S \rfloor) + \sum_{k=1}^{\lfloor S \rfloor+1} Q_{\pi(k)}\hat{\eta}(\lfloor S \rfloor + 1) - V.$$

It is observed that, given any integer $S_0$, the gradient $$\frac{d}{dS}\hat{U}(S)$$

remains constant for any $S \in (S_0, S_0+1)$. If $$\frac{d}{dS}\hat{U}(S) = 0,$$

consider $S_0$ or $S_0+1$ to be the local maximum. If $$\frac{d}{dS}\hat{U}(S) \neq 0,$$

using the optimality condition, $S \in (S_0, S_0+1)$ cannot be the maximum. It concludes that the maximum should be an integer.

Appendix D Proof of Theorem 3

Consider the queue dynamic in (3). By squaring the equation on both sides and using the property $[\max\{0,x\}]^2 \leq x^2$, $\forall k$ is obtained, $$Q_k^2(t+1) \leq Q_k^2(t) + \mu_k^2(t) - 2Q_k(t)(D_k(t) - A_k(t)) + A_k^2(t) \quad (33)$$

Following the definition of conditional Lyapunov drift $\Delta L(Q(t))$ in (6), taking conditional expectations and summing over all k inequalities in (33) yields $$\Delta L(Q(t)) \leq \quad (34)$$

$$E\left[\sum_k \mu_k^2(t) + A_k^2(t) \mid Q(t)\right] - 2\sum_k Q_k(t)E[D_k(t) - A_k(t) \mid Q(t)].$$

Denote positive constants and $\mu_{max}^{-2}$ such that $E[D_k^2(t)|Q(t)] \leq \mu_{max}^{-2}$ and $E[A_k^2(t)|Q(t)] \leq \lambda_{max}^{-2}$. Let $C_0 = \mu_{max}^{-2} + \mu_{max}^{-2}$. Adding $VE\{S(Q(t)|Q(t)\}$ on both sides, the drift (34) is bounded by $$\Delta L(Q(t)) + VE\{S(Q(t) \mid Q(t)\} \leq \quad (35)$$

$$C_0 K + 2\sum_k Q_k(t)\lambda_k - 2\sum_k Q_k(t)E[D_k(t) \mid Q(t)] + V\overline{S}.$$

Suppose now that the arrival $l=(\lambda_1, \ldots, \lambda_K)$ is strictly interior to the stability region C such that $l+\epsilon 1 \in C$, for $\epsilon > 0$. Since channel states are i.i.d. over time slots, it follows that there exists a stationary randomized feedback control policy that schedules user to feedback independent of queue $Q(t)$ and yields $E[D_k(t)|Q(t)]=E[R_k(t)] \geq \lambda_k + \epsilon$ and $E[S(Q(t)|Q(t)]= \overline{S}(\epsilon)$. Because the stationary policy is simply a particular feedback policy and note that the FFCA maximizes the term $\Sigma_k E[Q_k(t)R_k(t)]$ under and approximated feedback cost $\hat{S} \leq K$, the right hand side of (35) under FFCA is thus upper bounded by $C_0K - 2\epsilon\Sigma_k Q_k(t) + VK$.

Using the results in Lemma 2, it follows that $$\sum_k Q_k(t) \leq \frac{C_0 K + V\overline{S}}{2\varepsilon} \leq \frac{C_0 K + VK}{2\varepsilon} < \infty,$$

which proves that the FFCA policy stabilizes all the queues.

Appendix E Proof of Theorem 4

Consider the scaled sample path $$q_{max}^B(t) = \frac{1}{B}Q_{max}(\lfloor Bt \rfloor),$$

where the jumps can be given by (here, for ease of discussion, the identity $$q_{max}^B\left(\tau + \frac{1}{B}\right) - q_{max}^B(\tau) = \frac{1}{B}A_{m(\tau)} - \frac{1}{B}D_{m(\tau)}$$

is assumed to hold on the boundary, where the maximum queue index changes, i.e., $$m(\tau) \neq m\left(\tau + \frac{1}{B}\right)\right).$$

Note that, with the fluid approximation, such boundary effect (which violates the above equality) vanishes in the scaled sample path $q_{max}^B$ when B becomes large (and hence the jumps becomes smaller).

$$q_{max}^B(t) - q_{max}^B(t_0) = \frac{1}{B}\sum_{s=\lfloor Bt_0 \rfloor}^{\lfloor Bt \rfloor} A_{m(s)}(s) - \frac{1}{B}\sum_{s=\lfloor Bt_0 \rfloor}^{\lfloor Bt \rfloor} D_{m(s)}(s)$$

for $0 \leq t_0 < t \leq T_s$, where $m(s) = \arg\max Q_k(s)$ denotes the index of the maximum queue at time s. Note that, for $|t-t_0|$ small, the jump $q_{max}^B(t) - q_{max}^B(t_0)$ is a sum of sequence of random variables $v(s) = A_{m(s)} - D_{m(s)}$, whose $\tau$-step LMF is given by $$\Lambda_v^\tau = \frac{1}{\tau}\log E\left[\exp\left(\theta\sum_{s=t}^{t+\tau}(A_{m(s)} - D_{m(s)})\right)\right]$$

-continued $$= \log E[\exp(\theta A)] + \frac{1}{\tau}\log E\left[\exp\left(-\theta\sum_{s=t}^{t+\tau} D_{m(s)}\right)\right]$$

Under Assumption 3, taking $\tau \to \infty$, $\Lambda_\nu^\tau \to g(x, \theta)$, which defines the local rate function in (25), is obtained.

Thus, the Gartner-Ellis theory can be used to show the large deviation principle associated with the local rate function (25) for the non-i.i.d. sequence v(t) on each (w(t), w'(t)) pair following the path w(t). Then, the escape time $\tau_B = \inf\{t>0: q_{max}^B(t)>1\}$ is considered. Using the Freidlin-Wentzell theory obtains the large deviation principle $$\lim_{B \to \infty} \frac{1}{B}\log E[\tau_B] = I_0$$

for the random process $q_{max}^B(t)$.

Note that the mean escape time $\tau_B$ implies the steady state probability for $q_{max}^B(\infty)$ staying in the set $\{q_{max}^B(\infty)>1\}$, i.e., $$\lim_{B \to \infty} \frac{1}{B}\log E[\tau_B] = \lim_{B \to \infty} -\frac{1}{B}\log Pr(q_{max}^B(\infty) > 1).$$

Therefore, the first part of the theorem is established.

Appendix F Proof of Corollary 1

For the i-th beam, the CSI-only algorithm selects the user with the highest SINR for transmission. Denote $R_b^{(i)}$ as the corresponding transmission data rate and $ER_b^{(i)} = K\hat{\eta}(K)$, where $\hat{\eta}(-)$ is given in (18), is obtained.

Note that $D_k = \Sigma_i^t R_b^{(i)}/L$, where $t=0, \ldots,$ min $\{M, N\}$ is the number of beams assigned to user k and $$ED_k = \frac{M\hat{\eta}(K)}{L} \triangleq \mu_b.$$

Since $SINR_{k,n}^i$ are i.i.d. over k and $n=1, \ldots, N$, the probability for a user being assigned t beams approximately follows a binomial distribution B(M, p), with $$p = \frac{1}{K}.$$

It is well-known that B (M, p) $\to$ Poiss($\rho$) with $$\rho = \frac{M}{K},$$

as M, K $\to \infty$. Therefore, $D_k$ approximately follows the distribution of $$\hat{D}_k(K) = \frac{\xi}{L}K\hat{\eta}(K) \qquad (36)$$

where $\xi$: Poiss($\rho$). The LMF of $\hat{D}_k$ can be easily obtained as $\Lambda_{\hat{D}}(\theta) = \mu_b(e^\theta - 1)$. Note that $Q_{max}(t)$ and $Q_k(t)$ are identical under the CSI-only algorithm. Therefore, an explicit expression of the LMF is given as $$g(x,\theta) = \Lambda_A(\theta) + \Lambda_D(x,-\theta) = \lambda(e^\theta - 1) + \mu_b(e^{-\theta} - 1).$$

Using Theorem 4 and solving g $(x,\theta)=0$, $e^\theta = 1$ and $$e^\theta = \frac{\mu_b}{\lambda}$$

are obtained. It can be verified that $e^\theta = 1$ yields trivial solution I*=0. Then $$I_{baseline}^* \approx \log\frac{\mu_b}{\lambda} = \log\frac{MK\hat{\eta}(K)}{\lambda_{tot}L}. \qquad (37)$$

Moreover, using the extreme value theorem, obtains $ER_b^{(i)}/\log(P \log NK) \to 1$, as $K \to \infty$, which implies $K\hat{n}(K) \to \log(P \log NK)$. Therefore, $$I_{baseline}^* \approx \log\frac{M\log(P\log NK)}{\lambda_{tot}L}.$$

The conditions of Theorem 4 are satisfied when $\mu_b > \lambda$, or approximately, $$\hat{\mu}_b \triangleq \frac{M\log(P\log NK)}{KL} > \lambda.$$

Appendix G Proof of Lemma 5

Consider an upper bound ordered queue length profile as follows, $\hat{Q}_{\pi(1)} = Q_{max}$ and $$\hat{Q}_{\pi(j)} = Q_{max}\left(1 - \delta\frac{j-1}{K}\right),$$

where $\delta \geq 0$ is chosen such that $Q_{\pi(j)} \leq \hat{Q}_{\pi(j)}$ for all $j = \{1, \ldots, K\}$.

Note that using the extreme value theorem, provides $K\hat{\eta}(K)/\log(P \log NK) \to 1$, as $K \to \infty$, which implies that $$\hat{\eta}(K) \to \frac{M}{K}\log(P\log NK).$$

Focusing on large K, obtain a large S* which can validate the asymptotic approximation of $\hat{\eta}(S)$. Thus, the outer subproblem (21) is solved by substituting $Q_{\pi(k)}$ with $\hat{Q}_{\pi(k)}$ and $$\eta_{\pi(k)}(S) \approx \frac{M}{S}\log(P\log NS)$$

as follows, $$\max_{\hat{S}} g(\hat{S}) = \frac{Q_{max}}{2K}(2K + \delta - \delta\hat{S})M\log(P\log N\hat{S}) - V\hat{S}.$$

It can be shown that $g(\hat{S})$ is concave. Taking derivative of $g(\hat{S})$ and setting $$g'(\hat{S}^*) = 0,$$

-continued $$\hat{S}^* \log N\hat{S}^* = \left[\frac{V}{MQ_{max}} + \frac{\delta}{2K}\left(\log(P\log N\hat{S}^*) + \frac{1}{\log N\hat{S}^*} - \frac{1}{\hat{S}^* \log N\hat{S}^*}\right)\right]^{-1}.$$

Therefore, $$N\hat{S}^* \log N\hat{S}^* \leq \left(\frac{V}{MQ_{max}}\right)^{-1} N = \frac{MNQ_{max}}{V} \triangleq c_1,$$

for $\hat{S}^* \geq 3$ and all $\delta \geq 0$. Thus, $$\hat{S}^* \leq \frac{1}{N} e^{W(c_1)}.$$

Note that, under $\delta \to 0$, $\hat{Q}_{\pi(k)} \downarrow Q_{\pi(k)}$ and $$\frac{\delta}{2K}\left(\log(P\log NK) + \frac{1}{\log NK} - \frac{1}{\hat{S}^* \log N\hat{S}^*}\right) \to 0,$$

which means the upper bound is achieved when $Q_{\pi(k)} \approx Q_{max}$.

Note that, in the outer subproblem (21), increasing $Q_{\pi(k)}$ to $\hat{Q}_{\pi(k)}$ for every k yields a larger solution point $S^*(Q_{max}) \geq S^*(Q)$ [due to the term $\Sigma_{k=1}^S Q_{\pi(k)}$]. Hence, $$S^*(Q) \leq \hat{S}^*(Q_{max}) \leq \frac{1}{N} e^{W(c_1)}.$$

Appendix H Proof of Theorem 5

In Lemma 4, the departure rate $D_{max,b}(t; S)$ can be approximately given in (36), which is a decreasing function of S and has a Poisson distribution with mean $$\overline{D}_{max,b}(t; S) = \frac{M\hat{\eta}(S)}{L}.$$

With Lemma 4-5, $D_{max,p}(t; S^*) \geq D_{max,b}(t; S^*) \geq D_{max,b}(t; \hat{S}^*(Q_{max}))$, since $S^* \leq \hat{S}^*$. Moreover, using the extreme value theorem, $$\overline{D}_{max,b} \Big/ \frac{M}{LS} \log(P\log NK) \to 1,$$

as $K \to \infty$, which implies $$\overline{D}_{max,b}(t; \hat{S}(Q_{max})) \to \frac{M}{L\hat{S}^*(Q_{max})} \log(P\log N\hat{S}^*(Q_{max})) \triangleq \hat{\mu}_p(Q_{max}).$$

Consider the performance lower bound driven by the packet arrival process A(t) and departure process $D_{max,b}(t, \hat{S}^*(Q_{max}))$, which are both Poisson processes. The corresponding LMF is given by $$\hat{g}(x,\theta) = \lambda(e^{\theta}-1) + \hat{\mu}_p(x)(e^{-\theta}-1) \quad (38)$$

where $x = Q_{max}$. Use Theorem 4 and solve $\hat{g}(x, \theta) = 0$ to obtain $e^{\theta} = 1$ and $$e^{\theta} = \frac{\hat{\mu}_p(x)}{\lambda}.$$

One can verify that $e^{\theta} = 1$ only yields a trivial solution $\hat{I}^* = 0$. The lower bound rate function is calculated using $$\hat{I}^* = \int_0^1 \log \frac{\hat{\mu}_p(x)}{\lambda} dx.$$

Here, additional tricks should be used to complete the integral. Note that when $Q_{max}$ is small, $\hat{S}^*(Q_{max})$ is small, which violates the large S assymptotic assumption to obtain the approximated departure rate $D_{max,b}(t, \hat{S}^*(Q_{max}))$. To fix this, the following augmented approximation, $$\tilde{\mu}_p(Q_{max}) = \max\left\{\hat{\mu}_p(Q_{max}), \frac{Mr_0}{LK}\right\},$$

where $r_0 = \int_0^\infty \log(1+x) dF(x)$, is used. Note that $r_0$ is the average per-beam data rate, and hence $$\frac{Mr_0}{LK}$$

is a lower bound average package departure rate for the maximum queue process $Q_{max}(t)$.

Note that $\hat{\mu}_p(x)$ is monotonically increasing. Define $\epsilon_K$ as the solution to $$\hat{\mu}_p(x) = \frac{Mr_0}{LK},$$

and $\epsilon = \inf\{\epsilon_K : K \geq K_0\}$ for some $K_0 < \infty$. Using Theorem 4, $$\hat{I}^* \geq \int_0^1 \log \frac{\tilde{\mu}_p(x)}{\lambda} dx$$

$$= \int_0^1 \log\left(\frac{1}{\lambda_{tot}/K} \max\left\{\frac{M\log(P\log N\hat{S}^*(x))}{L\hat{S}^*(x)}, \frac{Mr_0}{LK}\right\}\right) dx$$

$$= \log \frac{M}{\lambda_{tot}L} + \int_0^\epsilon \log r_0 \, dx +$$

$$\int_\epsilon^1 \log \frac{\log(P\log N\hat{S}^*(x))K}{\hat{S}^*(x)} dx$$

$$= \log \frac{M}{\lambda_{tot}L} + \epsilon \log r_0 + (1-\epsilon)\log K + C \triangleq I_{prop}^{LB}$$

where $C = \int_\epsilon^1 \left\{\log\left[N\log\left(PW\left(\frac{MNx}{V}\right)\right)\right] - W\left(\frac{MNx}{V}\right)\right\} dx$, and $\tilde{\mu}_p(Q_{max})$ is a lower bound estimation for the departure for the first inequality.

Since $D_{max,p}(t; S^*) \geq D_{max,b}(t; S^*)$, $I_{prop}^* \geq \hat{I}^*$. Thus, the result has been proven.

Appendix I Proof of Theorem 6

The effect of the outdated QSI is analyzed. Let $m(t) = \arg\max_k Q_k(t)$ be the user who has the longest queue at time t.

Let F (t) denote the feedback group under the proposed FFCA with T=1. An important concern is whether the feedback group F ($t_0$) still contains the longest queue user m(t) at time t, i.e., the event m(t)∈F ($t_0$) happens at time t.

Considering the "best effort" event: the user m($t_0$) is scheduled at every time slot but is still in the feedback group F (t) at time t, $$E_{BE}(t) \triangleq$$

$$\left\{ Q_{max}(t_0) - \sum_{\tau=t_0}^{t} d_{m(t_0)}(\tau) + \sum_{\tau=t_0}^{t} A_{m(t_0)}(\tau) > Q_{\pi^-(t_0)}(t_0) + \sum_{\tau=t_0}^{t} A_{\pi^-(t_0)}(\tau) \right\}$$

where $d_{m(t_0)}(H_{m(t_0)}(\tau))$ is the packet departure rate under a fictitious "best effort" policy that schedules user m($t_0$) at every time slot regardlessly of Q(τ). Specifically, according to (19), the distribution of d is given by $$Pr(d \leq x) = Pr(\log(1 + PSINR) \leq x)$$
$$= Pr(SINR \leq P^{-1}(2^x - 1))$$
$$= F(P^{-1}(2^x - 1)).$$

In addition, $\pi^-(t_0)=\pi(S^*[Q(t_0)]+1)$ is the user who just cannot be selected in the feedback set F ($t_0$) at $t_0$. (Recall that π(−) is the ordered permutation of Q.) In $E_{BE}$, one schedules the outdated longest queue user m($t_0$) at every time slot, but still, no user from outside F ($t_0$) has the longest queue at time t. Note $Q_{m(t_0)}(t) \geq Q_{m(t_0)}^{BE}(t)$ where $Q_{m(t_0)}(t)$ is the queue length for user m($t_0$) under the queue-weighted scheduling in Stage II, and $Q_{m(t_0)}^{BE}(t)$ is under the "best effort" scheduling. Therefore, $Pr\{m(t)\in F(t_0)\} \geq Pr\{E_{BE}(t)\}$, for $t_0 \leq t \leq t_0+T-1$. The upper bound is tight in the heavy queue region for small T.

Moreover, since $Q_{max}(t_0) > Q_{\pi^-(t_0)}(t_0)$, under the i.i.d. assumption for the arrivals $A_k(t)$ and the CSI $H_k(t)$ respectively, $$Pr(E_{BE}(t)) \geq Pr\left\{ \sum_{\tau=t_0}^{t} v(\tau) > 0 \right\} \triangleq P_0^{t-t_0} \geq P_0^T$$

where $v(\tau)=A_1(\tau)-A_2(\tau)-d(\tau)$. The last inequality holds, since Ev(τ)<0 and $\Sigma_{\tau=1}^{\delta} v(\tau)$ is more negative as $t-t_0$ increases.

The departure rate for the process $Q_{max}(t)$ is discussed. Denote $D_{max}^{(T)}(H(t),Q(t); S^*(Q(t_0),F(t_0))$ as the packet departure for $Q_{max}^{(T)}(t)$ under the T-step feedback policy in $t_0 \leq t \leq t_0+T-1$, where the feedback probability is updated at time $t_0$. Similarly, denote $D_{max}(H(t), Q(t); S^*(Q(t), F(t))$ as the packet departure under the per time slot feedback policy update (T=1). This produces:

$$D_{max}^{(T)}(H(t),Q(t);S^*(Q(t_0),F(t_0)))$$
$$\approx D_{max}(H(t),Q(t);S^*(Q(t),F(t))) \cdot 1\{m(t)\in F(t_0)\}$$
$$\geq D_{max}(H(t),Q(t);S^*(Q(t),F(t))) \cdot 1\{E_{BE}(t)\}$$

where the lower bound is tight in heavy queue region and T is small. The first approximate equality holds because when the user with the maximum queue is outside the feedback group under outdated QSI, $Q_{max}(t)$ cannot be served at all.

According to Theorem 4, the solution to the LMF $\tilde{g}(x, \theta^*_T)=0$ under the T-step policy needs to be found. The LMF of the random variable $D_{max}^{(T)} \cdot 1\{E_{BE}\}$ is given by $$\Lambda_D^T(\theta) \triangleq \log E[\exp(\theta D_{max}(-)) 1\{E_{BE}(t)\}]$$
$$= \log E\{E[\exp(\theta D_{max}(-)) 1\{E_{BE}(t)\}] \mid 1\{E_{BE}(t)\}\}$$
$$= \log(1 - P_0^T + P_0^T \Lambda_D(\theta))$$

and the local LMF for the queuing process $Q_{max}(t)$ is $$\tilde{g}(x,\theta^{(T)})=\Lambda_A(\theta)+\log(1-P_0^T+P_0^T M_D(x,-\theta))$$

where $M_D(x, -\theta)$ is the MGF of $D_{max}(-)$.

To find the root $\theta^*_T(x)$ of the above function, a linearization, $\tilde{g}_L(x,\theta_T)=\tilde{g}(x,\theta_0(x))+\nabla_\theta \tilde{g}(x,\theta_0(x))\Delta\theta$, where $\theta_0(x)$ is the solution to in $\hat{g}(x,\theta(x))=0$ in (38) under the T=1 policy is considered. Let $\beta_0 \triangleq e^{\theta_0}$ and $\Delta\beta \approx e^{\theta_T}-\beta_0$. Setting $\tilde{g}_L(x,\theta_T)=0$, obtains:

$$\frac{\Delta\beta(x)}{\beta_0(x)} = -\frac{\hat{\mu}_p(x) - \lambda + \log(1 - P_0^T + P_0^T e^{(\lambda-\hat{\mu}_p(x))})}{\mu(x) - \lambda \frac{P_0^T e^{(\lambda-\hat{\mu}_p(x))}}{1 - P_0^T + P_0^T e^{(\lambda-\hat{\mu}_p(x))}}}$$

$$\geq -\frac{\hat{\mu}_p(x) - \lambda + \log(1 - P_0^T + P_0^T e^{(\lambda-\hat{\mu}_p(x))})}{\mu(x) - \lambda}$$

$$= -\frac{1}{\hat{\mu}_p(x) - \lambda} \log(e^{\hat{\mu}_p(x)-\lambda} - (e^{\hat{\mu}_p(x)-\lambda} - 1)P_0^T)$$

$$\triangleq \rho(x).$$

The approximation, which is obtained by linearization, becomes accurate when $P_0^T$ is close to 1. Therefore, using Theorem 4, the rate function under the T-step feedback policy is bounded by $$I_{prop}^{(T)^*} \geq \int_0^1 \theta^*_T(x) dx = \int_0^1 \log\beta_0\left(1 + \frac{\Delta\beta(x)}{\beta_0(x)}\right) dx \geq I_{prop}^{LB} - \int_0^1 \rho(x) dx.$$

Figure 12:
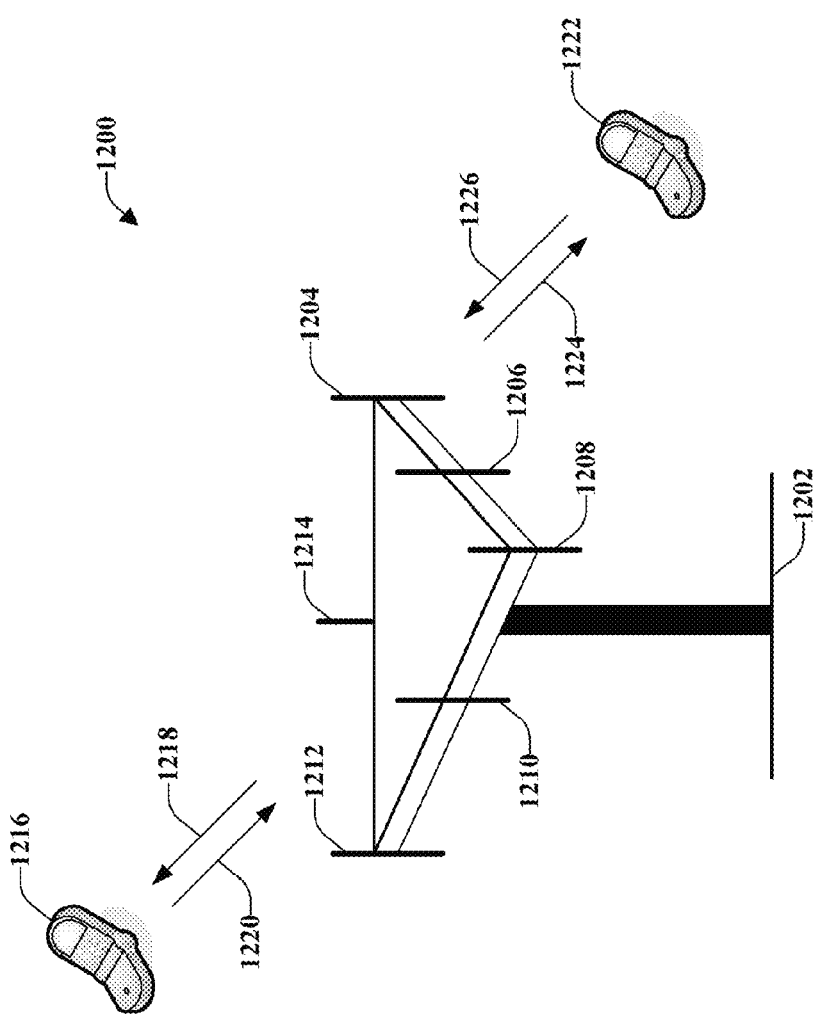
FIG. 12 illustrates a block diagram of an exemplary embodiment of an access point to implement and exploit one or more features or aspects of the disclosed subject matter.

Referring now to FIG. 12 a multiple access wireless communication system 1200 according to one or more aspects is illustrated. A wireless communication system 1200 can include one or more base stations in contact with one or more user devices. Each base station provides coverage for a plurality of sectors. A three-sector base station 1202 is illustrated that includes multiple antenna groups, one including antennas 1204 and 1206, another including antennas 1208 and 1210, and a third including antennas 1212 and 1214. According to the figure, only two antennas are shown for each antenna group, however, more or fewer antennas may be utilized for each antenna group. Mobile device 1216 is in communication with antennas 1212 and 1214, where antennas 1212 and 1214 transmit information to mobile device 1216 over forward link 1218 and receive information from mobile device 1216 over reverse link 1220. Forward link (or downlink) refers to communication link from base stations to mobile devices, and reverse link (or uplink) refers to communication link from mobile devices to base stations. Mobile device 1222 is in communication with antennas 1204 and 1206, where antennas 1204 and 1206 transmit information to mobile device 1222 over forward link 1224 and receive information from mobile device 1222 over reverse link 1226. In a FDD system, for example, communication links 1218, 1220, 1224, and 1226 might utilize different frequencies for communication. For example, forward link 1218 might use a different frequency than the frequency utilized by reverse link 1220.

Each group of antennas and/or the area in which they are designated to communicate may be referred to as a sector of base station 1202. In one or more aspects, antenna groups each are designed to communicate to mobile devices in a sector or the areas covered by base station 1202. A base station may be a fixed station used for communicating with mobile devices.

In communication over forward links 1218 and 1224, transmitting antennas of base station 1202 can utilize beamforming in order to improve a signal-to-noise ratio of forward links for different mobile devices 1216 and 1222. Also, a base station utilizing beamforming to transmit to mobile devices scattered randomly through its coverage area might cause less interference to mobile devices in neighboring cells than the interference that can be caused by a base station transmitting through a single antenna to all mobile devices in its coverage area.

Figure 13:
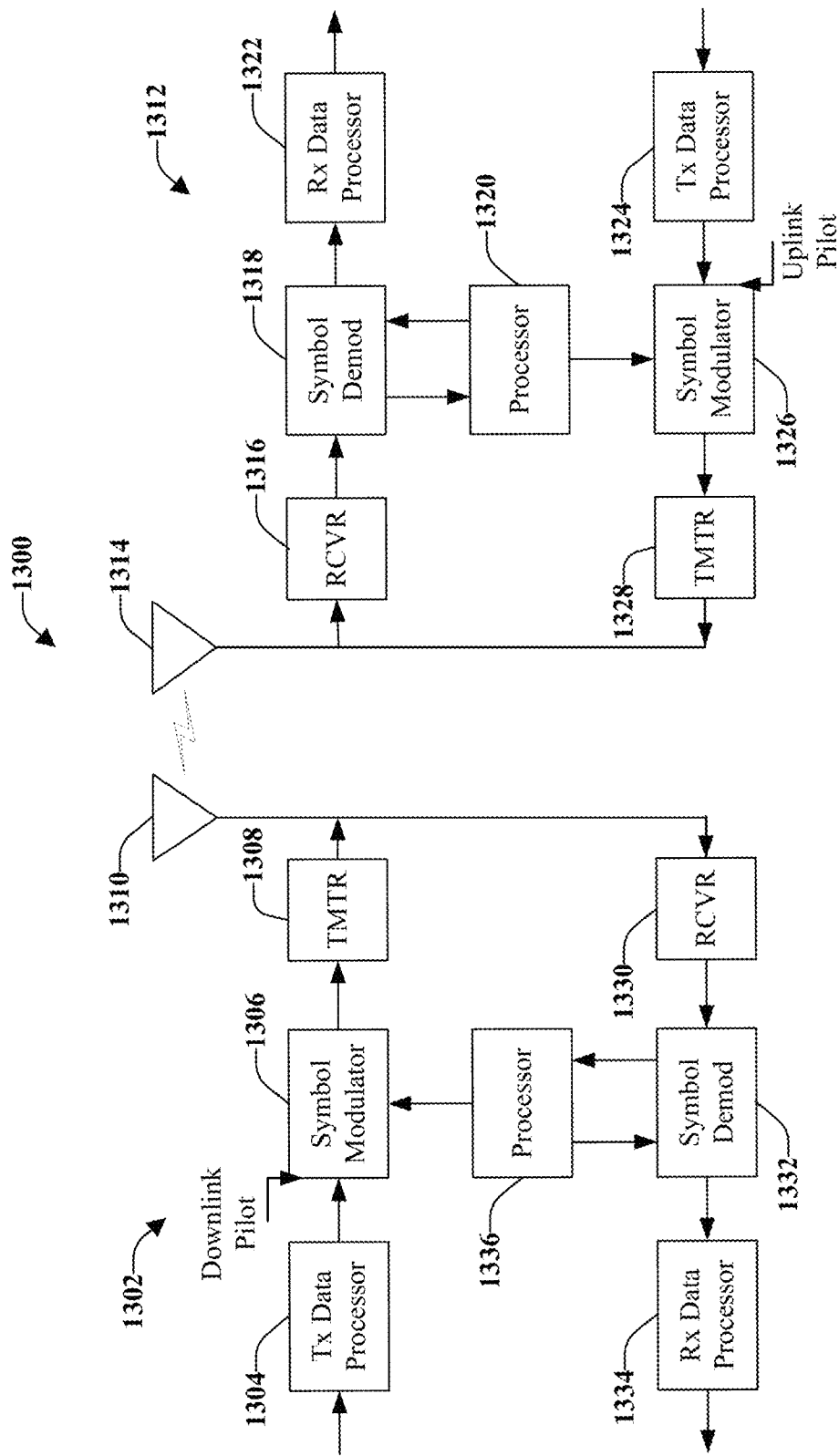
FIG. 13 is a block diagram of an exemplary embodiment of a mobile network platform to implement and exploit various features or aspects of the disclosed subject matter.

FIG. 13 illustrates an exemplary wireless communication system 1300, according to various aspects. Wireless communication system 1300 depicts one base station and one terminal for sake of brevity. However, it is to be appreciated that system 1300 can include more than one base station or access point and/or more than one terminal or user device, wherein additional base stations and/or terminals can be substantially similar or different from the exemplary base station and terminal described below. In addition, it is to be appreciated that base station and/or terminal can employ various aspects described herein to facilitate wireless communication there between.

On a downlink, at access point 1302, a transmit (TX) data processor 1304 receives, formats, codes, interleaves, and modulates (or symbol maps) traffic data and provides modulation symbols ("data symbols"). A symbol modulator 1306 receives and processes data symbols and pilot symbols and provides a stream of symbols. Symbol modulator 1306 multiplexes data and pilot symbols and obtains a set of N transmit symbols. Each transmit symbol may be a data symbol, a pilot symbol, or a signal value of zero. Pilot symbols may be sent continuously in each symbol period. Pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1308 receives and converts the stream of symbols into one or more analog signals and further conditions (e.g., amplifies, filters, frequency upconverts, and so on) analog signals to generate a downlink signal suitable for transmission over wireless channel. Downlink signal is then transmitted through an antenna 1310 to terminals. At terminal 1312, an antenna 1314 receives downlink signal and provides a received signal to a receiver unit (RCVR) 1316. Receiver unit 1316 conditions (e.g., filters, amplifies, frequency downconverts, and so forth) received signal and digitizes conditioned signal to obtain samples. A symbol demodulator 1318 obtains N received symbols and provides received pilot symbols to a processor 1320 for channel estimation. Symbol demodulator 1318 further receives a frequency response estimate for the downlink from processor 1320 and performs data demodulation on received data symbols to obtain data symbol estimates (which are estimates of transmitted data symbols). Further, symbol demodulator 1318 provides data symbol estimates to a RX data processor 1322, which demodulates (e.g., symbol demaps), deinterleaves, and decodes the data symbol estimates to recover transmitted traffic data. Processing by symbol demodulator 1318 and RX data processor 1322 is complementary to processing by symbol modulator 1306 and TX data processor 1304, respectively, at access point 1302.

On uplink, a TX data processor 1324 processes traffic data and provides data symbols. A symbol modulator 1326 receives and multiplexes data symbols with pilot symbols, performs modulation, and provides a stream of symbols. A transmitter unit 1328 receives and processes the stream of symbols to generate an uplink signal, which is transmitted by antenna 1314 to access point 1302.

At access point 1302, uplink signal from terminal 1312 is received by antenna 1310 and processed by a receiver unit 1330 to obtain samples. A symbol demodulator 1332 processes the samples and provides received pilot symbols and data symbol estimates for uplink. A RX data processor 1334 processes data symbol estimates to recover traffic data transmitted by terminal 1312. A processor 1336 performs channel estimation for each active terminal transmitting on uplink.

Processors 1336 and 1320 direct (e.g., control, coordinate, manage, and so forth) operation at access point 1302 and terminal 1312, respectively. Respective processors 1336 and 1320 can be associated with memory units (not shown) that store program codes and data. Processors 1336 and 1320 can also perform computations to derive frequency and impulse response estimates for uplink and downlink, respectively.

For a multiple-access system (e.g., FDMA, OFDMA, CDMA, TDMA, and the like), multiple terminals can transmit concurrently on uplink. For such a system, pilot subbands may be shared among different terminals. Channel estimation techniques may be used in cases where pilot subbands for each terminal span the entire operating band (possibly except for band edges). Such a pilot subband structure would be desirable to obtain frequency diversity for each terminal. The techniques described herein may be implemented by various means. For example, these techniques may be implemented in hardware, software, or a combination thereof. For a hardware implementation, processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform functions described herein, or a combination thereof. With software, implementation can be through modules (e.g., procedures, functions, and so on) that perform functions described herein. Software codes may be stored in memory unit and executed by processors 1336 and 1320.

Figure 14:
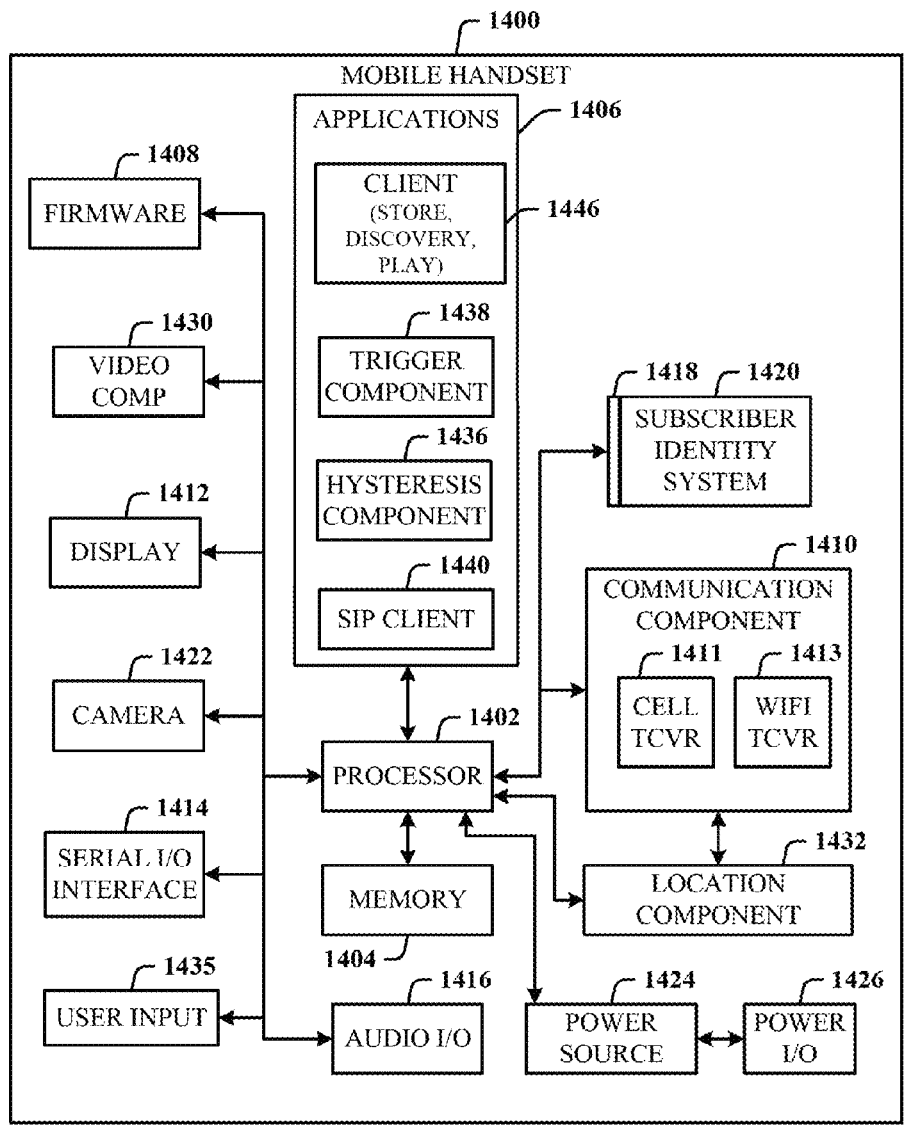
FIG. 14 illustrates an example of a device, a client device in accordance with the embodiments disclosed herein.

FIG. 14 illustrates a schematic block diagram of an exemplary device 1400 capable of employing the subject system in accordance with some embodiments of the invention. The device is a mobile handset 1400 In order to provide additional context for various aspects thereof, FIG. 14 and the following discussion are intended to provide a brief, general description of a suitable environment 1400 in which the various aspects can be implemented. While the description includes a general context of computer-executable instructions, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1400 includes a processor 1402 for controlling and processing all onboard operations and functions. A memory 1404 interfaces to the processor 1402 for storage of data and one or more applications 1406 (e.g., a video player software, user feedback component software, . . . ). Other applications can include voice recognition of predetermined voice commands that facilitate initiation of the user feedback signals. The applications 1406 can be stored in the memory 1404 and/or in a firmware 1408, and executed by the processor 1402 from either or both the memory 1404 or/and the firmware 1408. The firmware 1408 can also store startup code for execution in initializing the handset 1400. A communications component 1410 interfaces to the processor 1402 to facilitate wired/wireless communication with external systems, e.g., cellular networks, VoIP networks, and so on. Here, the communications component 1410 can also include a suitable cellular transceiver 1411 (e.g., a GSM transceiver) and an unlicensed transceiver 1413 (e.g., WiFi, WiMax) for corresponding signal communications. The handset 1400 can be a device such as a cellular telephone, a PDA with mobile communications capabilities, and messaging-centric devices. The communications component 1410 also facilitates communications reception from terrestrial radio networks (e.g., broadcast), digital satellite radio networks, and Internet-based radio services networks.

The handset 1400 includes a display 1412 for displaying text, images, video, telephony functions (e.g., a Caller ID function), setup functions, and for user input. The display 1412 can also accommodate the presentation of multimedia content (e.g., music metadata, messages, wallpaper, graphics, . . . ). A serial I/O interface 1414 is provided in communication with the processor 1402 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1400, for example. Audio capabilities are provided with an audio I/O component 1416, which can include a speaker for the output of audio signals related to, for example, indication that the user pressed the proper key or key combination to initiate the user feedback signal. The audio I/O component 1416 also facilitates the input of audio signals through a microphone to record data and/or telephony voice data, and for inputting voice signals for telephone conversations.

The handset 1400 can include a slot interface 1418 for accommodating a SIC (Subscriber Identity Component) in the form factor of a card Subscriber Identity Module (SIM) or universal SIM 1420, and interfacing the SIM card 1420 with the processor 1402. However, it is to be appreciated that the SIM card 1420 can be manufactured into the handset 1400, and updated by downloading data and software thereinto.

The handset 1400 can process IP data traffic through the communication component 1410 to accommodate IP traffic from an IP network such as, for example, the Internet, a corporate intranet, a home network, a person area network, etc., through an ISP or broadband cable provider. Thus, VoIP traffic can be utilized by the handset 1400 and IP-based multimedia content can be received in either an encoded or decoded format.

A video processing component 1422 (e.g., a camera) can be provided for decoding encoded multimedia content. The handset 1400 also includes a power source 1424 in the form of batteries and/or an AC power subsystem, which power source 1424 can interface to an external power system or charging equipment (not shown) by a power I/O component 1426.

The handset 1400 can also include a video component 1430 for processing video content received and, for recording and transmitting video content. A location tracking component 1432 facilitates geographically locating the handset 1400. As described hereinabove, this can occur when the user initiates the feedback signal automatically or manually. A user input component 1434 facilitates the user initiating the quality feedback signal. The input component can include such conventional input device technologies such as a keypad, keyboard, mouse, stylus pen, and touch screen, for example.

Referring again to the applications 1406, a hysteresis component 1436 facilitates the analysis and processing of hysteresis data, which is utilized to determine when to associate with the access point. A software trigger component 1438 can be provided that facilitates triggering of the hysteresis component 1438 when the WiFi transceiver 1413 detects the beacon of the access point. A SIP client 1440 enables the handset 1400 to support SIP protocols and register the subscriber with the SIP registrar server. The applications 1406 can also include a client 1446 that provides at least the capability of discovery, play and store of multimedia content, for example, music.

The handset 1400, as indicated above related to the communications component 1410, includes an indoor network radio transceiver 1413 (e.g., WiFi transceiver). This function supports the indoor radio link, such as IEEE 802.11, for the dual-mode GSM handset 1400. The handset 1400 can accommodate at least satellite radio services through a handset that can combine wireless voice and digital radio chipsets into a single handheld device.

Figure 15:
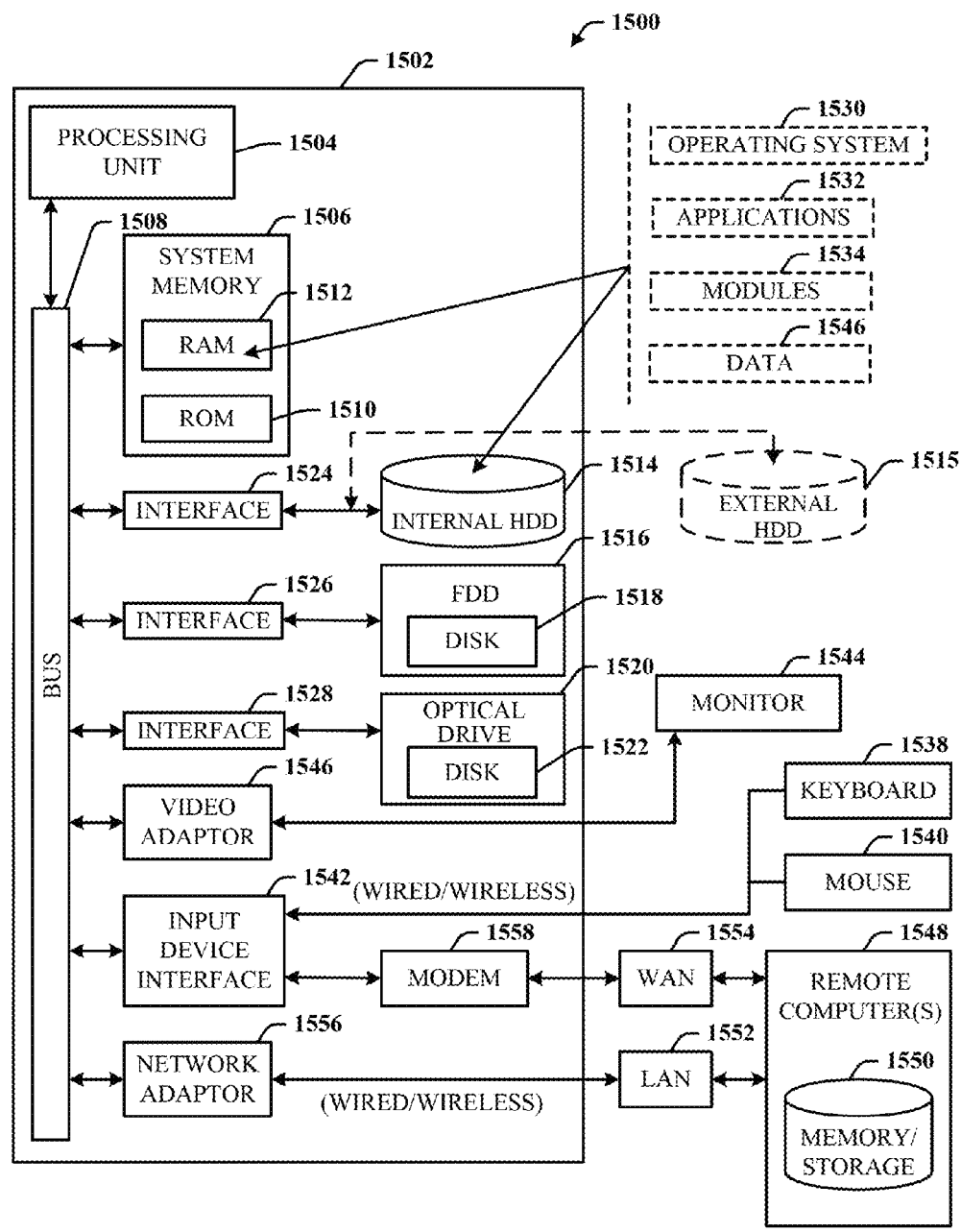
FIG. 15 illustrates a block diagram of a computer operable to execute the disclosed MU-MIMO data adaption platform and MAC adaptation platform.

Referring now to FIG. 15, there is illustrated a block diagram of a computer operable to provide networking and communication capabilities between a wired or wireless communication network and a server and/or communication device. In order to provide additional context for various aspects thereof, FIG. 15 and the following discussion are intended to provide a brief, general description of a suitable computing environment 1500 in which the various aspects of the innovation can be implemented. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 15, the exemplary environment 1500 for implementing various aspects includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 can also be configured for external use in a suitable chassis 1515, a magnetic floppy disk drive (FDD) 1516, (e.g., to read from or write to a removable diskette 1518) and an optical disk drive 1520, (e.g., reading a CD-ROM disk 1022 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is to be appreciated that the innovation can be implemented with various commercially available operating systems or combinations of operating systems.

A user can enter commands and information into the computer 1502 through one or more wired/wireless input devices, e.g., a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 2394 serial port, a game port, a USB port, an IR interface, etc.

A monitor 1544 or other type of display device is also connected to the system bus 1508 through an interface, such as a video adapter 1546. In addition to the monitor 1544, a computer typically includes other peripheral output devices (not shown), such as speakers, printers, etc.

The computer 1502 can operate in a networked environment using logical connections by wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which may connect to a global communications network, e.g., the Internet.

When used in a LAN networking environment, the computer 1502 is connected to the local network 1552 through a wired and/or wireless communication network interface or adapter 1556. The adaptor 1556 may facilitate wired or wireless communication to the LAN 1552, which may also include a wireless access point disposed thereon for communicating with the wireless adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 through the serial port interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

It is to be understood that aspects described herein may be implemented by hardware, software, firmware, or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the s and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the s and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the s and/or actions of a method or algorithm may reside as one or any combination or set of codes and/or instructions on a machine-readable medium and/or computer readable medium, which may be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system comprising:
   a memory storing executable components; and
   a processor configured to execute the executable components, the executable components comprising:
   a feedback filter component configured to determine a subset of mobile device candidates having a feedback priority from among a set of mobile device candidates based on a set of queue state information of a plurality of transmitters and receivers of a plurality of mobile devices communicatively coupled in a multiple input multiple output channel;
   a random beamforming component configured to transmit, at a set of time slots, a communication that identifies the subset of mobile device candidates prior to receiving a set of channel state information corresponding to the subset of mobile device candidates, using random beamforming that facilitates a near-orthogonal data stream transmission to the subset of mobile device candidates; and
   a scheduling component configured to select a portion of the subset of mobile device candidates and to schedule communications with the portion of the subset of mobile device candidates, based on feedback comprising the set of channel state information corresponding to the subset of mobile device candidates and the set of queue state information of the plurality of mobile devices.

2. The system of claim 1, wherein the scheduling component is further configured to select the portion of the subset of mobile device candidates determined to have a signal-to-interference-plus-noise ratio that satisfies a defined condition from among the set of mobile device candidates.

3. The system of claim 1, wherein the near-orthogonal data stream transmission to the subset of mobile device candidates comprises random orthogonal vectors generated in accordance with an isotropic distribution of the near-orthogonal data stream.

4. The system of claim 1, wherein the feedback filter component is further configured to determine user feedback probabilities at a number of time slots based on a set of user queuing backlogs and communicate the user feedback probabilities to enable the subset of mobile device candidates to feedback the set of channel state information according to the user feedback probabilities that independently correspond to the subset of mobile device candidates.

5. The system of claim 4, wherein the scheduling component is further configured to receive the feedback according to the user feedback probabilities via a noiseless feedback channel and at a defined time slot of the time slots.

6. The system of claim 1, wherein the scheduling component is further configured to schedule a set of transmissions for the portion of the subset of mobile device candidates to communicate among the plurality of transmitters and receivers of the multiple input multiple output channel concurrently according to a spatial degree of freedom, independent of global channel state information.

7. The system of claim 1, wherein the scheduling component is further configured to receive the feedback in response to satisfaction of a stochastic feedback filtering condition that reduces a feedback cost of the system by conditionally allowing the portion of the subset of mobile device candidates to provide the feedback.

8. The system of claim 1, wherein the feedback further comprises selected beam indices and effective signal-to-interference-plus-noise ratios that correspond to the selected beam indices, from the subset of mobile device candidates.

9. The system of claim 8, wherein the scheduling component is further configured to select the portion of the subset of mobile device candidates from among the subset of mobile device candidates based on the selected beam indices and the effective signal-to-interference-plus-noise ratios that are greater than the effective signal-to-interference-plus-noise ratios of other mobile device candidates of the subset of mobile device candidates.

10. The system of claim 1, wherein the communication enables the subset of mobile device candidates to communicate the feedback while preventing other mobile devices of the set of mobile device candidates from communicating the feedback.

11. The system of claim 10, wherein the feedback filter component is further configured to determine the subset of mobile device candidates by selecting mobile device candidates from the set of mobile device candidates that are determined to satisfy a defined condition associated with a queue delay length.

12. The system of claim 1, wherein the scheduling component is further configured to select the portion of the subset of mobile device candidates based on a determination of a queue delay length associated with the plurality of mobile device queues.

13. The system of claim 1, wherein the feedback filter component is further configured to determine the subset of mobile device candidates by defining a queue stability and a queue stability region among arrival data vectors for the plurality of mobile devices.

14. The system of claim 13, wherein the executable components further comprise:
a throughput feedback component configured to generate a feedback probability vector that stabilizes the arrival data vectors from the feedback within the queue stability region to achieve an increased throughput.

15. The system of claim 1, wherein the executable components further comprise:
a feedback component configured to determine a user feedback amount enabling a determination of the subset of mobile device candidates.

16. A method, comprising:
determining a subset of mobile device candidates from among a set of mobile device candidates based on queue state information of a plurality of mobile device queues for a plurality of transmitters and receivers communicatively coupled in a multiple input multiple output channel;
transmitting a communication comprising a random beam that supports a near-orthogonal data stream to the subset of mobile device candidates that initiates feedback comprising channel state information from the subset of mobile device candidates in the plurality of mobile device queues; and
selecting a portion of the subset of mobile device candidates for scheduling communications via the multiple input multiple output channel.

17. The method of claim 16, further comprising:
receiving the feedback from the subset of mobile device candidates in the plurality of mobile device queues.

18. The method of claim 16, further comprising generating the random beam that supports near-orthogonal data stream transmissions to the subset of mobile device candidates in accordance with an isotropic distribution prior to obtaining knowledge of a global channel state information for the set of mobile device candidates.

19. The method of claim 16, further comprising:
determining a set of user backlogs for the set of mobile device candidates for the plurality of mobile device queues that comprises a set of state-dependent coupled queues; and
sending a set of user feedback probabilities associated with the set of mobile device candidates as a function of the set of user backlogs.

20. The method of claim 19, further comprising:
in response to a stochastic feedback filtering condition being satisfied, receiving a set of effective signal-to-interference-plus noise ratios corresponding to a set of beams on receive antennas of the subset of mobile device candidates.

21. The method of claim 20, further comprising:
scheduling the portion of the subset of mobile device candidates to transmit at the set of beams corresponding to the portion of the subset of mobile device candidates according to a maximum effective signal-to-interference-plus noise ratio of the set of effective signal-to-interference-plus noise ratios.

22. The method of claim 16, wherein determining the subset of mobile device candidates from among the set of mobile device candidates comprises:
generating a queue stability condition and a queue stability region for the set of mobile device candidates of the plurality of mobile device queues, wherein the queue stability region comprises a set of arrival rate vectors of the set of mobile device candidates that are stabilized by a set of feedback probability vectors.

23. The method of claim 22, further comprising:
determining a feedback cost and a maximum queue stability region based on the feedback cost for the set of mobile device candidates of the plurality of mobile device queues; and receiving the feedback from the subset of mobile device candidates of the set of mobile device candidates that comprises the channel state information based on a set of probability vectors.

24. The method of claim 23, further comprising:
scheduling the portion of the subset of mobile device candidates, based on a defined tradeoff between an average queue delay length and the feedback cost, to transmit the communications.

25. The method of claim 23, further comprising:
generating a determination of the subset of mobile device candidates having a larger queue delay length than other mobile device candidates of the set of mobile device candidates; and
initiating the feedback from the subset of mobile device candidates in the plurality of mobile device queues based on the determination.

26. A computer readable storage device comprising executable instructions that, in response to execution, cause at least one device including at least one processor to perform operations, the operations comprising:
determining a subset of mobile device antennas from a set of mobile device antennas, based on queue state information of a multi user queue of a multiple input multiple output channel;
transmitting a communication to the subset of mobile device antennas that enables the subset of mobile device antennas having a queue delay length that satisfies a queue delay length condition among the set of mobile device antennas to communicate a set of feedback;
receiving the set of feedback that comprises channel state information from the subset of mobile device antennas of the multi user queue; and
selecting a portion of the subset of mobile device antennas based on the channel state information.

27. The computer readable storage device of claim 26, wherein the communication to the subset of mobile device antennas is a near orthogonal data stream transmission comprised of random orthogonal vectors.

28. The computer readable storage device of claim 26, wherein the operations further comprise:
scheduling the portion of the subset of mobile device antennas to transmit with a set of beams corresponding to a maximum effective signal-to-interference-plus noise ratio associated with the portion of the subset of mobile device antennas.

29. The computer readable storage device of claim 28, wherein the operations further comprise:
determining a feedback cost and a maximum queue stability region based on the feedback cost for the set of mobile device antennas of the multi user queue; and
receiving the set of feedback from the subset of mobile device antennas of the set of mobile device antennas according to a set of probability vectors.

30. The computer readable storage device of claim 26, wherein selecting the portion of the subset of mobile device antennas to transmit a communication is further based on a tradeoff of an average queue delay length of the multi user queue and a feedback cost of the subset of mobile device antennas.

31. A device comprising:
a memory storing executable instructions; and
a processor configured to execute the executable instructions to at least:
receive a broadcast comprising a queue state information dependent feedback candidate data designating a subset of mobile device candidates having a feedback priority from among a set of mobile device candidates based on a set of queue state information of a plurality of mobile device queues for a multiple input multiple output channel, wherein the queue state information dependent feedback candidate data enables communication of feedback based on a feedback filtering condition that is a function of a feedback probability, and wherein the feedback probability is determined from queuing backlogs for a set of time slots of the plurality of mobile device queues; and
communicate the feedback comprising local channel state information in response to the feedback filtering condition being satisfied.

32. The device of claim 31, wherein the processor further facilitates the execution of the executable instructions to:
in response to the feedback filtering condition being satisfied, determine a signal-to-interference-plus noise ratio for a set of antennas.

33. The device of claim 31, wherein the processor further facilitates the execution of the executable instructions to:
in response to the feedback filtering condition being satisfied, select a strongest beam based on signal-to-interference-plus noise ratios from among a set of antennas.

34. The device of claim 33, wherein the feedback further comprises a beam index for the strongest beam and a corresponding signal-to-interference-plus noise ratio.

35. The device of claim 34, wherein the queue state information dependent feedback candidate data facilitates a selection of mobile device candidates using the strongest beam and the corresponding signal-to-interference-plus noise ratio.

36. The device of claim 31, wherein the processor further facilitates the execution of the executable instructions to:
communicate the local channel state information on a noiseless feedback channel to a base station.

37. The device of claim 31, wherein the processor further facilitates the execution of the executable instructions to:
receive a scheduling priority to communicate data via the multiple input multiple output channel from among the subset of mobile device candidates based on an average queue delay of the plurality of mobile device queues and a feedback cost; and
communicate data via the multiple input multiple output channel.

* * * * *